United States Patent
Fontaine et al.

(10) Patent No.: US 10,351,646 B2
(45) Date of Patent: Jul. 16, 2019

(54) POLYOLEFIN COMPOSITION AND METHOD OF PRODUCING THE SAME

(71) Applicant: Dow Global Technologies LLC, Midland, MI (US)

(72) Inventors: Philip P. Fontaine, Freeport, TX (US); Susan G. Brown, Freeport, TX (US); Andrew J. Young, Freeport, TX (US); David M. Pearson, Freeport, TX (US); Edmund M. Carnahan, Freeport, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 15/538,686

(22) PCT Filed: Dec. 28, 2015

(86) PCT No.: PCT/US2015/067676
§ 371 (c)(1),
(2) Date: Jun. 22, 2017

(87) PCT Pub. No.: WO2016/109429
PCT Pub. Date: Jul. 7, 2016

(65) Prior Publication Data
US 2018/0002464 A1 Jan. 4, 2018

Related U.S. Application Data

(60) Provisional application No. 62/098,438, filed on Dec. 31, 2014.

(51) Int. Cl.
*C08F 4/64* (2006.01)
*C08F 4/76* (2006.01)
*C08F 210/16* (2006.01)
*C08F 4/659* (2006.01)

(52) U.S. Cl.
CPC ............ *C08F 210/16* (2013.01); *C08F 4/659* (2013.01); *C08F 4/65908* (2013.01); *C08F 4/65912* (2013.01); *C08F 2410/01* (2013.01); *Y02P 20/582* (2015.11)

(58) Field of Classification Search
CPC ............. C08F 4/60193; C08F 4/64193; C08F 210/16; C08F 2/38
See application file for complete search history.

(56) References Cited

U.S. PATENT DOCUMENTS

| | | | |
|---|---|---|---|
| 4,250,104 A | | 2/1981 | Giannini et al. |
| 4,478,989 A * | 10/1984 | Goodall | ................ C08F 110/00 502/125 |
| 4,529,780 A * | 7/1985 | Foerster | .................. C08F 10/00 502/125 |
| H1254 H * | 11/1993 | Mostert | ..................... C08F 4/44 526/142 |
| 5,292,970 A * | 3/1994 | Kupper | .................... C07C 37/14 568/790 |
| 5,329,032 A * | 7/1994 | Tran | ........................ C07F 5/068 252/182.35 |
| 5,519,098 A * | 5/1996 | Brown | ..................... C08F 10/02 502/113 |
| 5,547,675 A * | 8/1996 | Canich | ....................... C07F 7/10 502/103 |
| 5,908,903 A * | 6/1999 | Rosch | ...................... C08F 10/00 502/125 |
| 6,252,021 B1 * | 6/2001 | Lee | .......................... C08F 10/00 526/141 |
| 6,310,151 B1 * | 10/2001 | Windisch | ................. C08F 36/04 526/136 |
| 7,928,172 B2 | | 4/2011 | Luo et al. |
| 8,202,953 B2 | | 6/2012 | Konze et al. |

(Continued)

FOREIGN PATENT DOCUMENTS

EP 1650235 A1 4/2006
WO WO 99/30821 A1 * 6/1999 .............. B01J 31/00

(Continued)

OTHER PUBLICATIONS

Busico et al. J.Am.Chem.Soc. 2003, 125, 12402-12403.*
Reddy et al. Eur. Polym. J. 1997, 33, 583-585.*
Busico et al. Macromolecules 2009, 42, 1789-1791.*
Descour et al. Polym. Chem. 2013, 4, 4718-4729.*
Balke et al., "A Strategy for Interpreting Multidetector Size-Exclusion Chromatography Data II", Chromotography of Polymers, 1992, Chapter 13.
Busico et al., "Improving the Performance of Methylalumoxane: A Facile and Efficient Method to Trap "Free" Trimethylaluminium", J. Amer. Chem. Soc. 2003, 125, 12402-12403.
Busico et al., "Hafnocenes and MAO: Beware of Trimethylaluminium", Macromolecules 2009, 42, 1789-1791.
Descour et al., "Exploration of the effect of 2,6-(t-Bu)2-4-Me-C6H2OH (BHT) in chain shuttling polymerization", Polym. Chem., 2013, 4, 4718-4729.

(Continued)

*Primary Examiner* — Rip A Lee

(57) ABSTRACT

The instant invention provides a polyolefin composition and method of producing the same. The olefin polymerization process according to the present invention comprises contacting one or more olefinic monomers with a biphenylphenolic polymerization catalyst under polymerization conditions and in the presence of one or more treated aluminum-based scavengers in a polymerization reactor, wherein said one or more treated aluminum-based scavengers comprise the reaction product of an alkylaluminum or an aluminoxane specie with a compound of the general Formula (I): wherein X is O, N, or S and R is alkyl, aryl, heteroalkyl, heteroaryl, or hydrogen, wherein n=1 if X is O or S and n=1 if X is N, and wherein at least one R is not a hydrogen; $R_n$—X—H (I); thereby producing a polyolefin composition which comprises less than 50% of the oligomer level of a polyolefin composition produced in an olefin polymerization process in the presence of said one or more untreated aluminum-based scavengers.

6 Claims, 6 Drawing Sheets

(56) References Cited

U.S. PATENT DOCUMENTS

| | | | | |
|---|---|---|---|---|
| 8,354,484 | B2* | 1/2013 | Konze | C08F 10/00 |
| | | | | 526/134 |
| 9,453,089 | B2* | 9/2016 | Shaikh | C07C 2/20 |
| 2005/0239637 | A1* | 10/2005 | Lindroos | C08F 110/02 |
| | | | | 502/117 |
| 2009/0048408 | A1 | 2/2009 | Kwag et al. | |
| 2010/0291334 | A1 | 11/2010 | Cann et al. | |
| 2011/0213110 | A1* | 9/2011 | Shimizu | C07F 9/5022 |
| | | | | 526/172 |
| 2015/0148504 | A1* | 5/2015 | Ewart | C08F 110/02 |
| | | | | 526/184 |

FOREIGN PATENT DOCUMENTS

| | | |
|---|---|---|
| WO | 2012027448 A1 | 3/2012 |
| WO | 2014105414 A1 | 4/2014 |

OTHER PUBLICATIONS

International Search Report and Written Opinion pertaining to PCT/US2015/067676 dated Apr. 26, 2016.

Karjala et al., "Detection of Low Levels of Long-Chain Branching in Polyolefins", Annual Technical Conference, Society of Plastics Engineers (2008), 66th, 887-891.

Kratochvil, P., "Fundamental Light-Scattering Methods", Classical Light Scattering from Polymer Solutions, Elsevier, Oxford, NY (1987).

Monrabal et al, "Crystallization Elution Fractionation. A new Separation Process for Polyolefin Resins", Macromol. Symp., 2007, 257, 71-79.

Mourey et al., "A Strategy for Interpreting Multidetector Size-Exclusion Chromatography Data I", Chromotography of Polymers, 1992, Chapter 12.

Reddy et al., "Role of Trimethylaluminium on the Zirconocene-Methylaluminoxane-Catalyzed Polymerization of ethylene", Macromolecules 1993, 26, 1180-1182.

Reddy et al., "Styrene polymerization using titanium-n-butoxide-sterically hindered aryloxy derivative of trimethylaluminum catalyst system" Eur. Polym. J. 1997, 33, 583-585.

Wesslau, Herman, "On Molecular Weight Distributions of Low-Pressure Polyethylenes, Third Report: Low-Pressure Polyethylenes with a Narrow Molecular Weight Distribution", Die Makromolekulare Chemie, 195, 1vol. 26, 102-119.

Williams et al., "Activation of [Cp2ZrMe2] with New Perfluoroaryl Diboranes: Solution Chemistry and Ethylene Polymerization Behavior in the Presence of MeAl(BHT)2", Angew. Chem. Int. Ed. 1999, 38, 3695-3698.

Zimm, B., "Apparatus and Methods for Measurement and Interpretation of the Angular Variation of Light Scattering; Preliminary Results on Polystyrene Solutions", J. Chem. Phys., 1948, vol. 16, No. 12, 1099.

Search Report and Written Opinion, dated Jul. 13, 2018, related to Singapore Patent Application No. 11201705243S.

* cited by examiner

POLYOLEFIN COMPOSITION AND METHOD OF PRODUCING THE SAME

FIELD OF INVENTION

The instant invention relates to a polyolefin composition and method of producing the same.

BACKGROUND OF THE INVENTION

Olefin based polymers such as polyethylene are produced via various catalyst systems and polymerization processes. Selection of such catalyst systems used in the polymerization process of the olefin based polymers is an important factor contributing to the characteristics and properties of such olefin based polymers.

Polyethylene is known for use in the manufacture of a wide a variety of articles. The polyethylene polymerization process can be varied in a number of ways to produce a wide variety of resultant polyethylene resins having different physical properties suitable for use in different applications. It is generally known that polyethylene can be produced in solution phase loop reactors in which ethylene monomer, and optionally one or more alpha olefin comonomers, typically having from 3 to 10 carbon atoms, are circulated in the presence of one or more catalyst systems under pressure around a loop reactor by a circulation pump. The ethylene monomers and optional one or more comonomers are present in a liquid diluent, such as an alkane or isoalkane, for example isobutane. Hydrogen may also be added to the reactor. The catalyst systems for producing polyethylene may typically comprise a chromium-based catalyst system, a Ziegler Natta catalyst system, and/or a molecular (either metallocene or non-metallocene) catalyst system. The reactants in the diluent and the catalyst system are circulated at an elevated polymerization temperature around the loop reactor thereby producing polyethylene homopolymer and/or copolymer depending on whether or not one or more comonomers are present. Either periodically or continuously, part of the reaction mixture, including the polyethylene product dissolved in the diluent, together with unreacted ethylene and one or more optional comonomers, is removed from the reactor (e.g. loop reactors, isothermal reactors, fluidized bed reactors, stirred tank reactors, batch reactors in parallel, series, and/or any combinations thereof). The reaction mixture when removed from the loop reactor may be processed to remove the polyethylene product from the diluent and the unreacted reactants, with the diluent and unreacted reactants typically being recycled back into the loop reactor. Alternatively, the reaction mixture may be sent to a second reactor, e.g. loop reactor, serially connected to the first loop reactor where a second polyethylene fraction may be produced.

Despite the research efforts in developing catalyst systems and processes suitable for polyolefin polymerization, there is still a need for an improved polyolefin polymerization process reducing the production of any undesired oligomers.

SUMMARY OF THE INVENTION

The instant invention provides a polyolefin composition and method of producing the same.

In one embodiment, the instant invention provides a process to mitigate oligomer formation in an olefin polymerization process in a polymerization reactor utilizing a biphenylphenolic polymerization catalyst comprising adding one or more treated aluminum-based scavengers to the polymerization reactor, wherein said one or more treated aluminum-based scavengers comprise the reaction product of an alkylaluminum or an aluminoxane specie with a compound of the general Formula I, wherein X is O, N, or S and R is alkyl, aryl, heteroalkyl, heteroaryl, or hydrogen, wherein n=1 if X is O or S and n=1 if X is N, and wherein at least one R is not a hydrogen;

$$R_n\text{—X—H} \qquad \text{Formula I.}$$

In an alternative embodiment, the instant invention further provides an olefin polymerization process comprising contacting one or more olefinic monomers with a biphenylphenolic polymerization catalyst under polymerization conditions and in the presence of one or more treated aluminum-based scavengers in a polymerization reactor, wherein said one or more treated aluminum-based scavengers comprise the reaction product of an alkylaluminum or an aluminoxane specie with a compound of the general Formula I, wherein X is O, N, or S and R is alkyl, aryl, heteroalkyl, heteroaryl, or hydrogen, wherein n=1 if X is O or S and n=1 if X is N, and wherein at least one R is not a hydrogen;

$$R_n\text{—X—H} \qquad \text{Formula I.}$$

In another alternative embodiment, the instant invention further provides a polyolefin composition comprising the polymerization reaction product of one or more olefinic monomers in the presence of at least one biphenylphenolic polymerization catalyst and one or more treated aluminum-based scavengers under polymerization conditions, wherein said one or more treated aluminum-based scavengers comprise the reaction product of an alkylaluminum or an aluminoxane specie with a compound of the general Formula I, wherein X is O, N, or S and R is alkyl, aryl, heteroalkyl, heteroaryl, or hydrogen, wherein n=1 if X is O or S and n=1 if X is N, and wherein at least one R is not a hydrogen;

$$R_n\text{—X—H} \qquad \text{Formula I,}$$

and wherein the polyolefin composition comprises less than 50% of the oligomer level of a polyolefin composition produced in an olefin polymerization process in the presence of an untreated aluminum-based scavenger.

In an alternative embodiment, the instant invention provides a polyolefin composition and method of producing the same, in accordance with any of the preceding embodiments, except that the treated aluminum-based scavengers is a butylated-hydroxytoluene (BHT) treated aluminum-based scavenger.

In an alternative embodiment, the instant invention provides a polyolefin composition and method of producing the same, in accordance with any of the preceding embodiments, except that the aluminoxane specie is methylalumoxane.

In an alternative embodiment, the instant invention provides a polyolefin composition and method of producing the same, in accordance with any of the preceding embodiments, except that the butylated-hydroxytoluene (BHT) treated aluminum-based scavenger is (BHT)$_2$AlEt, the structure of which is:

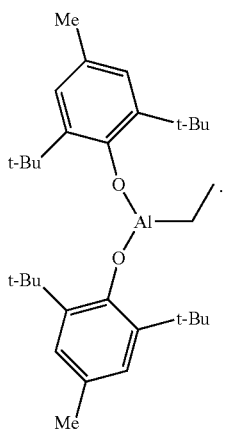

BRIEF DESCRIPTION OF THE DRAWINGS

For the purpose of illustrating the invention, there is shown in the drawings a form that is exemplary; it being understood, however, that this invention is not limited to the precise arrangements and instrumentalities shown.

DETAILED DESCRIPTION OF THE INVENTION

Figure 1:
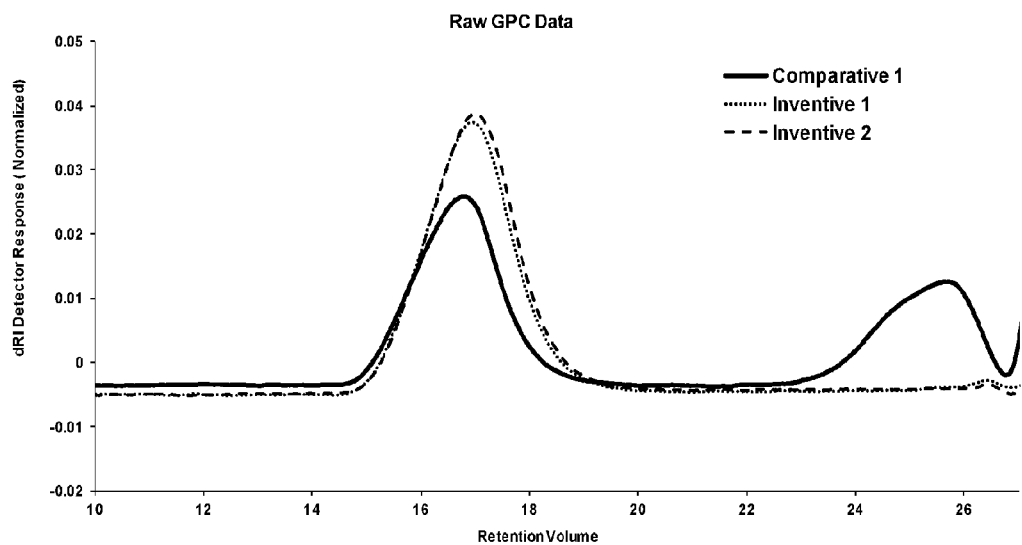
FIG. 1 is a graph of the GPC data showing polymeric and oligomeric regions for (BHT)$_2$AlEt and MMAO.
Figure 2:
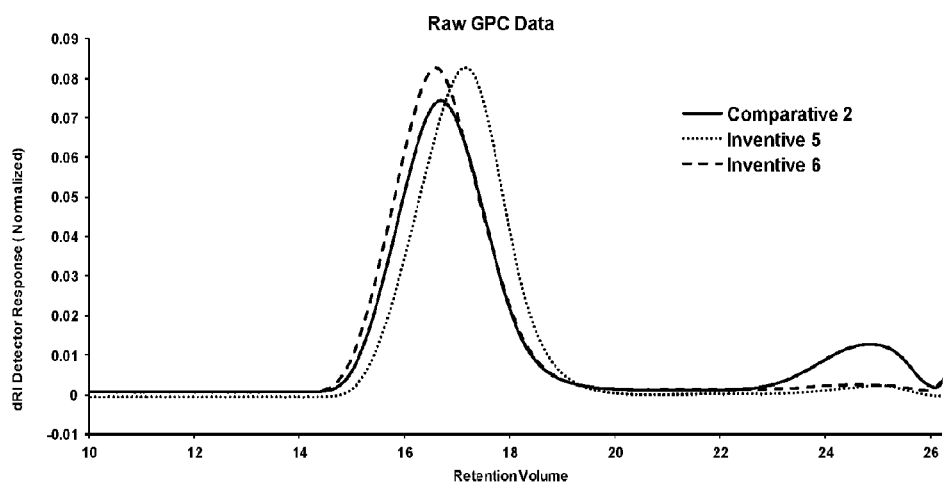
FIG. 2 is a graph of the GPC data showing polymeric and oligomeric regions for BHT-MMAO and MMAO.
Figure 3:
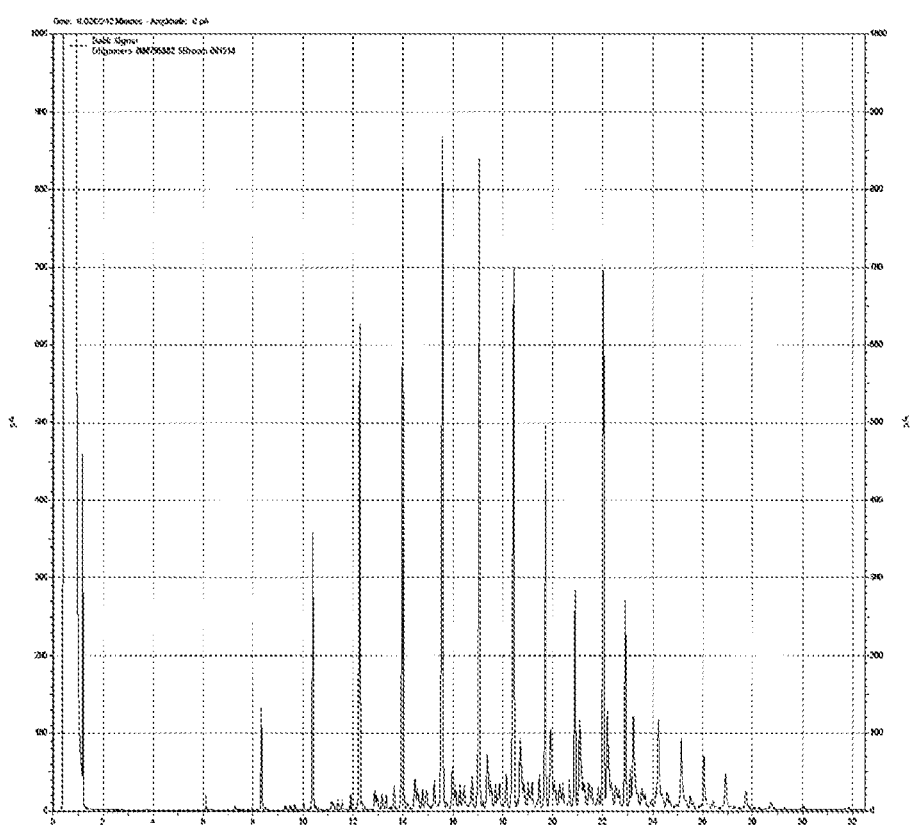
FIG. 3 is a graph of the GC of oligomer extract for Comparative Example 10 with MMAO.
Figure 4:
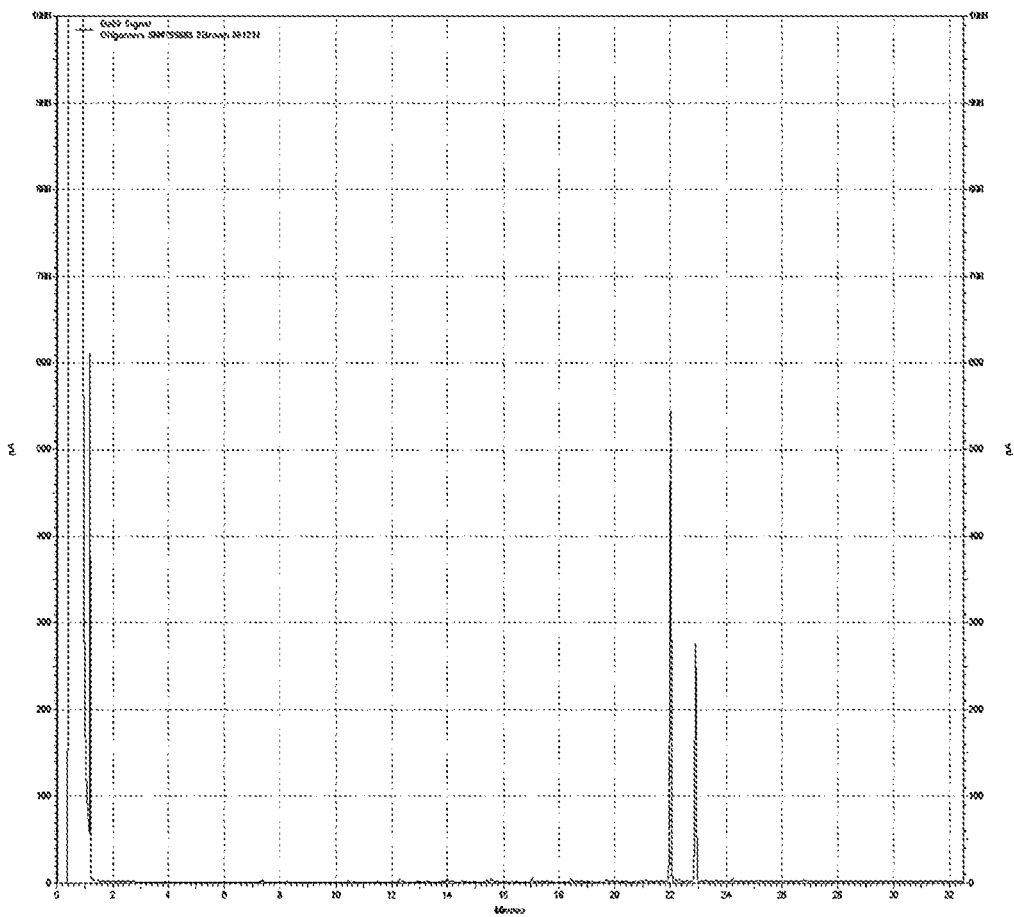
FIG. 4 is a graph of the GC of oligomer extract for Inventive Example 21 with (BHT)$_2$AlEt.
Figure 5:
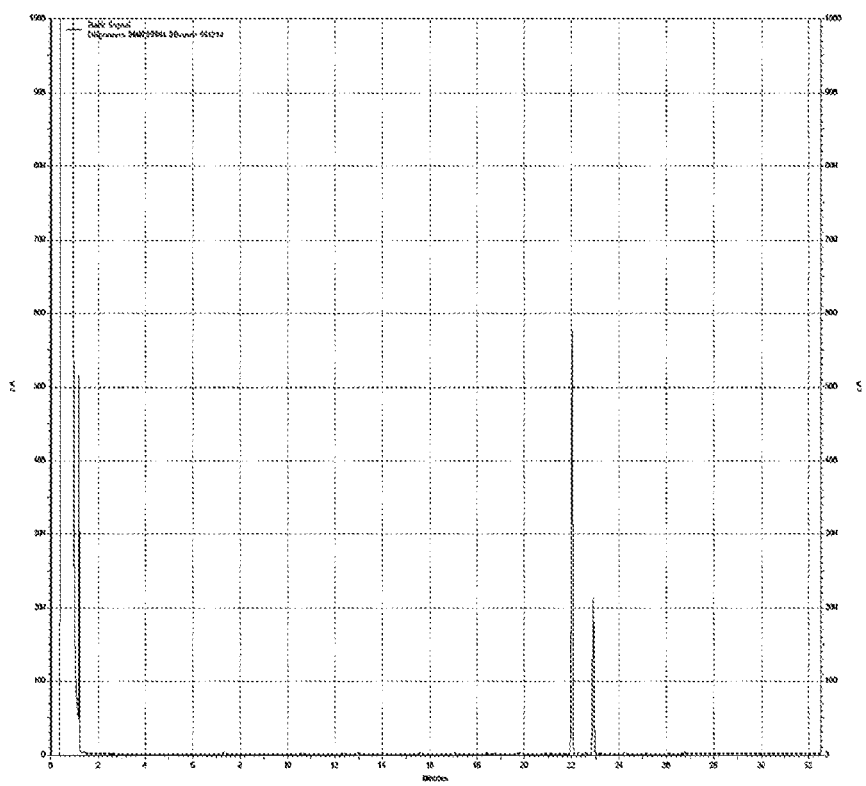
FIG. 5 is a graph of the GC of oligomer extract Inventive Example 22 with (BHT)$_2$AlEt.
Figure 6:
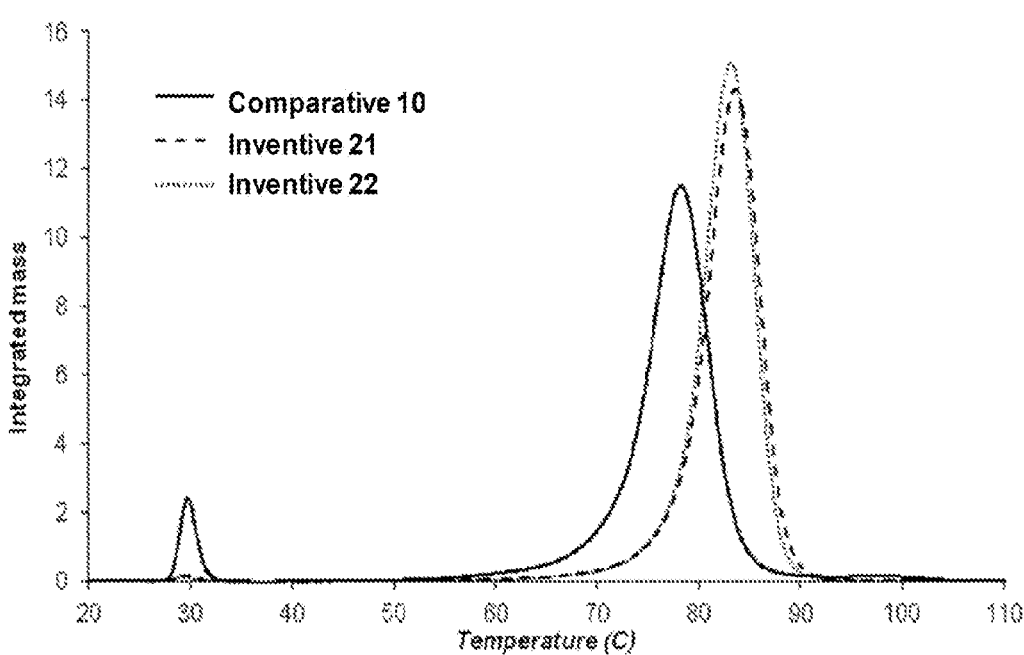
FIG. 6 is a graph of the CEF overlay of Comparative Example 10, Inventive Examples 21 and 22.
Figure 7:
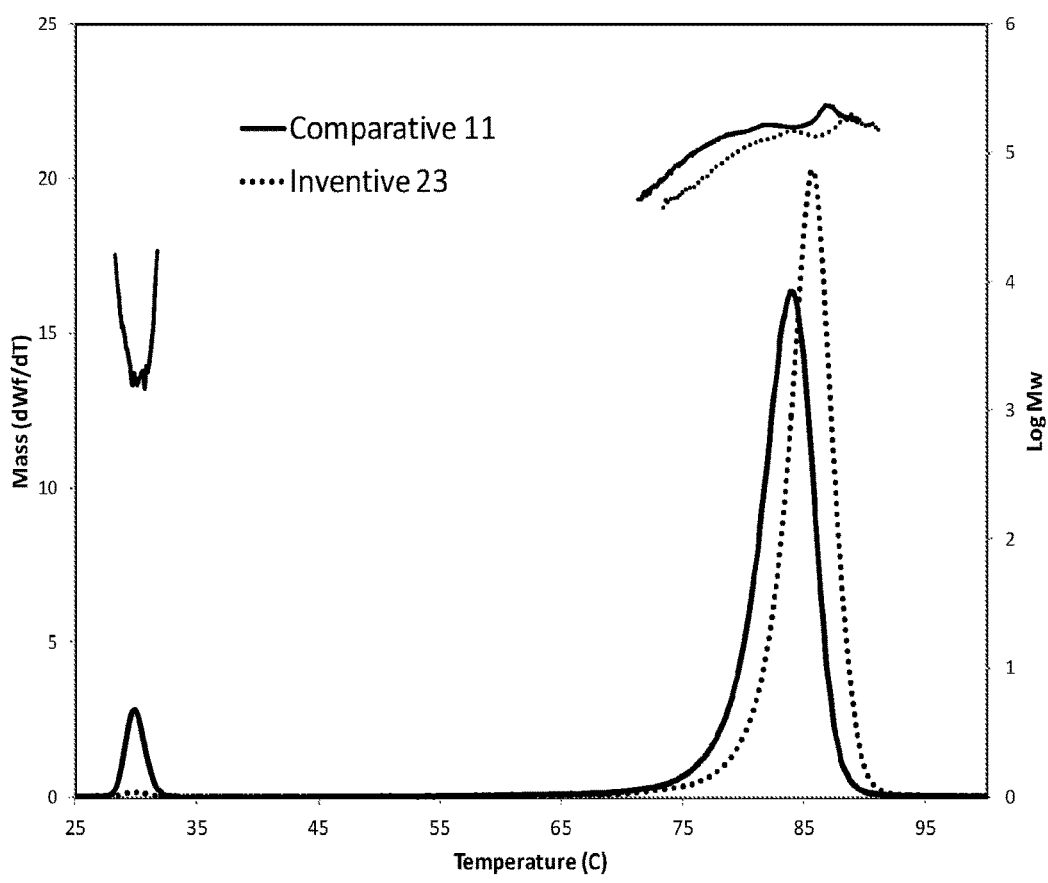
FIG. 7 is graph of the CEF overlay of Comparative Example 11 and Inventive Example 23.
Figure 8:
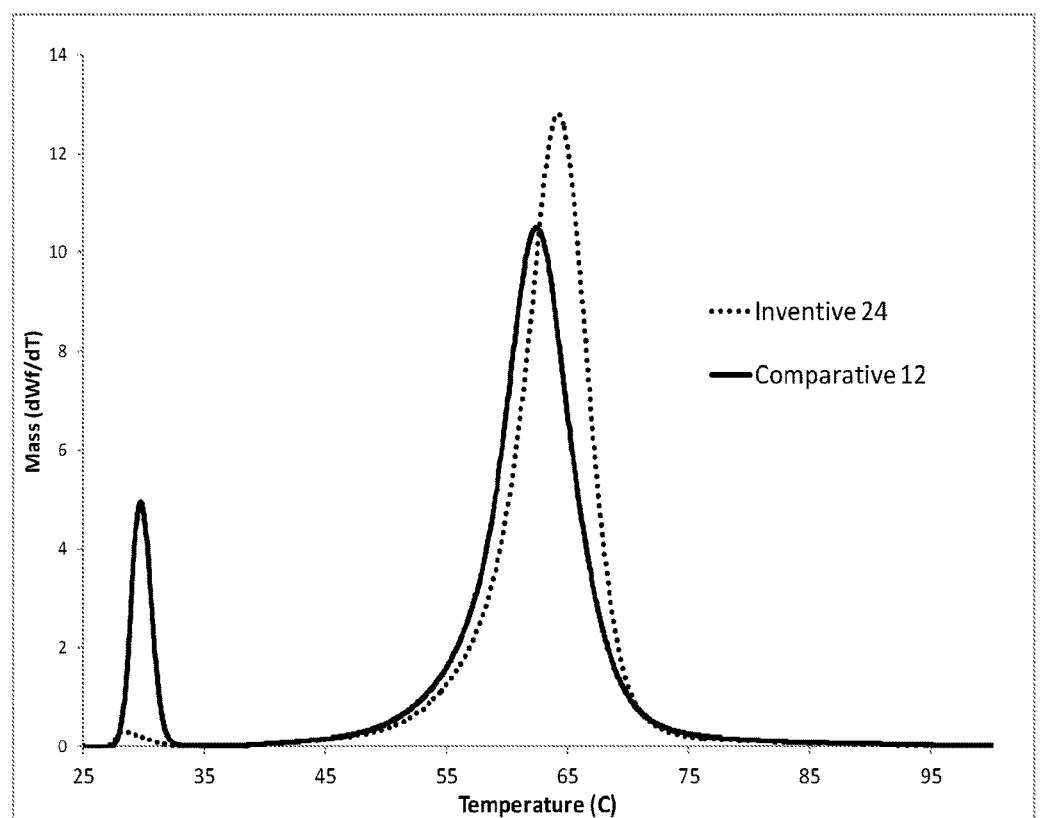
FIG. 8 is a graph of the CEF overlay of Comparative Example 12 and Inventive Example 24.

As used herein, "oligomer" means one or more polymerized monomers having a final Mw of less than 2,000 g/mole.

The term "treated" as used herein signifies the addition of a compound of Formula I to a suitable alkylaluminum or aluminoxane species in such a manner to produce a reaction product. The instant invention provides a polyolefin composition and method of producing the same. The a polyolefin composition comprising the polymerization reaction product of one or more olefinic monomers in the presence of at least one biphenylphenolic polymerization catalyst and one or more treated aluminum-based scavengers under polymerization conditions, wherein said one or more treated aluminum-based scavengers comprise the reaction product of an alkylaluminum or an aluminoxane specie with a compound of the general Formula I, wherein X is O, N, or S and R is alkyl, aryl, heteroalkyl, heteroaryl, or hydrogen, wherein n=1 if X is O or S and n=1 if X is N, and wherein at least one R is not a hydrogen;

R$_n$—X—H                                        Formula I, and wherein the polyolefin composition comprises less than 50% of the oligomer level of a polyolefin composition produced in an olefin polymerization process in the presence of an untreated aluminum-based scavenger.

In one embodiment, the instant invention provides a process to mitigate oligomer formation in an olefin polymerization process in a polymerization reactor utilizing a biphenylphenolic polymerization catalyst comprising adding one or more treated aluminum-based scavengers to the polymerization reactor, wherein said one or more treated aluminum-based scavengers comprise the reaction product of an alkylaluminum or an aluminoxane specie with a compound of the general Formula I, wherein X is O, N, or S and R is alkyl, aryl, heteroalkyl, heteroaryl, or hydrogen, wherein n=1 if X is O or S and n=1 if X is N, and wherein at least one R is not a hydrogen;

R$_n$—X—H                                        Formula I.

In an alternative embodiment, the instant invention further provides an olefin polymerization process comprising contacting one or more olefinic monomers with a biphenylphenolic polymerization catalyst under polymerization conditions and in the presence of one or more treated aluminum-based scavengers in a polymerization reactor, wherein said one or more treated aluminum-based scavengers comprise the reaction product of an alkylaluminum or an aluminoxane specie with a compound of the general Formula I, wherein X is O, N, or S and R is alkyl, aryl, heteroalkyl, heteroaryl, or hydrogen, wherein n=1 if X is O or S and n=1 if X is N, and wherein at least one R is not a hydrogen;

R$_n$—X—H                                        Formula I.

In an alternative embodiment, the instant invention provides a polyolefin composition and method of producing the same, in accordance with any of the preceding embodiments, except that the treated aluminum-based scavengers is a butylated-hydroxytoluene (BHT) treated aluminum-based scavenger.

In an alternative embodiment, the instant invention provides a polyolefin composition and method of producing the same, in accordance with any of the preceding embodiments, except that the aluminoxane specie is methylalumoxane.

In an alternative embodiment, the instant invention provides a polyolefin composition and method of producing the same, in accordance with any of the preceding embodiments, except that the butylated-hydroxytoluene (BHT) treated aluminum-based scavenger is:

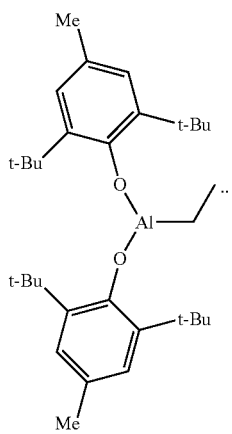

Aluminum-Based Scavenger

The treated aluminum-based scavengers comprise the reaction product of an alkylaluminum or an aluminoxane specie with a compound of the general Formula I, wherein X is O, N, or S and R is alkyl, aryl, heteroalkyl, heteroaryl, or hydrogen, wherein n=1 if X is O or S and n=1 if X is N, and wherein at least one R is not a hydrogen;

$$R_n\text{—}X\text{—}H \qquad \text{Formula I.}$$

The treated aluminum-based scavenger can be a treated alkyl aluminum such as treated monoalkyl aluminum dihydride, treated monoalkylaluminum dihalide, treated dialkyl aluminum hydride, treated dialkyl aluminum halide, and/or treated trialkylaluminum; and treated aluminoxanes such as treated methylalumoxane, and/or treated isobutylalumoxane In one embodiment, the treated aluminum-based scavenger can be a treated modified methyl aluminoxane (treated-MMAO). In another embodiment, the treated aluminum-based scavenger can be a treated triethyl aluminum (treated-TEA).

In one embodiment, the treated aluminum-based scavenger is a butylated-hydroxytoluene (BHT) treated aluminum-based scavenger. The BHT treated aluminum-based scavenger can be a BHT treated alkyl aluminum such as BHT treated monoalkyl aluminum dihydride, BHT treated monoalkylaluminum dihalide, BHT treated dialkyl aluminum hydride, BHT treated dialkyl aluminum halide, and/or BHT treated trialkylaluminum; and BHT treated aluminoxanes such as BHT treated methylalumoxane, and/or BHT treated isobutylalumoxane In one embodiment, the BHT treated aluminum-based scavenger can be a BHT treated modified methyl aluminoxane (BHT-MMAO). In another embodiment, the BHT treated aluminum-based scavenger is

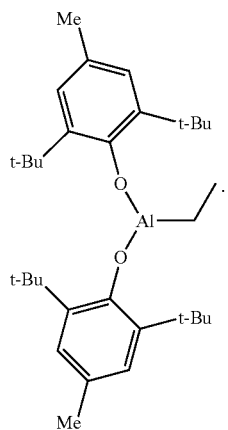

In one embodiment, the treated aluminum-based scavenger comprises the reaction product of an alkylaluminum or an aluminoxane specie with a compound selected from the group consisting of phenols and alcohols. In one embodiment, the treated aluminum-based scavenger comprises the reaction product of an alkylaluminum or an aluminoxane species with a compound selected from one of the following:

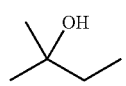
1

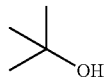
2

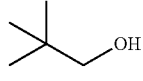
3

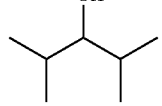
4

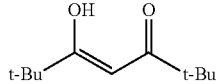
5

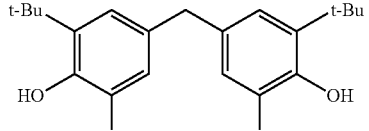
6

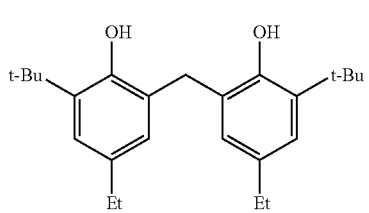
7

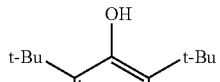

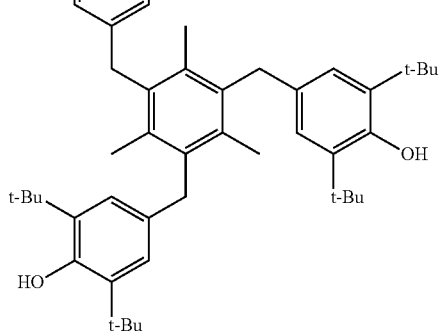
8

The ratio of total number of moles of one or more metal-ligand complexes of Formula (II) to total number of moles of one or more of the aluminum-based scavenger is from 1:10,000 to 100:1. In some embodiments, the ratio is at least 1:5000, in some other embodiments, at least 1:1000; and 10:1 or less, and in some other embodiments, 1:1 or less. In an alternative embodiment, the instant invention provides a polyolefin composition and method of producing the same, in accordance with any of the preceding embodiments, except that ratio of total number of moles of one or more metal-ligand complexes of Formula (II) (see below) to total number of moles of one or more of the aluminum-based scavenger is from 1:10 to 1:100.

The treated aluminum-based scavenger can also be used as the activating co-catalyst. When the treated aluminum-based scavenger alone is used as the activating co-catalyst, preferably the number of moles of the alumoxane that are employed is at least 25 times the number of moles of the metal-ligand complex of Formula (II). In a particular embodiment, the number of moles of the alumoxane that are employed is no more than 1000 times the number of moles of the metal-ligand complex of Formula (II).

Such treated aluminum-based scavenger can be obtained via contacting MMAO or TEA with BHT in solution under inert gas, in the absence of oxygen and moisture and optionally in the presence of heat.

Biphenylphenolic Polymerization Catalyst

The biphenylphenolic polymerization catalyst according to the present invention comprises a procatalyst component comprising a metal-ligand complex of Formula (II):

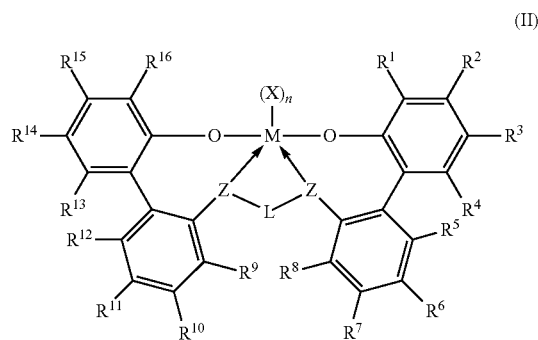

(II)

wherein:

M is titanium, zirconium, or hafnium, each independently being in a formal oxidation state of +2, +3, or +4; and n is an integer of from 0 to 3, and wherein when n is 0, X is absent; and Each X independently is a monodentate ligand that is neutral, monoanionic, or dianionic; or two Xs are taken together to form a bidentate ligand that is neutral, monoanionic, or dianionic; and X and n are chosen in such a way that the metal-ligand complex of formula (I) is, overall, neutral; and Each Z independently is O, S, N($C_1$-$C_{40}$)hydrocarbyl, or P($C_1$-$C_{40}$)hydrocarbyl; and O is O (an oxygen atom);

L is ($C_1$-$C_{40}$)hydrocarbylene or ($C_1$-$C_{40}$)heterohydrocarbylene, wherein the ($C_1$-$C_{40}$)hydrocarbylene has a portion that comprises a 1-carbon atom to 10-carbon atom linker backbone linking the two Z groups in formula (II) (to which L is bonded) or the ($C_1$-$C_{40}$)heterohydrocarbylene has a portion that comprises a 1-atom to 10-atom linker backbone linking the two Z groups in formula (II), wherein each of the 1 to 10 atoms of the 1-atom to 10-atom linker backbone of the ($C_1$-$C_{40}$)heterohydrocarbylene independently is a carbon atom or heteroatom, wherein each heteroatom independently is O, S, S(O), S(O)$_2$, Si($R^C$)$_2$, Ge($R^C$)$_2$, P($R^C$), or N($R^C$), wherein independently each $R^C$ is ($C_1$-$C_{30}$)hydrocarbyl or ($C_1$-$C_{30}$) heterohydrocarbyl; and $R^{1-16}$ are selected from the group consisting of a ($C_1$-$C_{40}$) hydrocarbyl, ($C_1$-$C_{40}$)heterohydrocarbyl, Si($R^C$)$_3$, Ge($R^C$)$_3$, P($R^C$)$_2$, N($R^C$)$_2$, OR$^C$, SR$^C$, NO$_2$, CN, CF$_3$, $R^C$S(O), $R^C$S (O)$_2$, ($R^C$)$_2$C=N, $R^C$C(O)O, $R^C$OC(O), $R^C$C(O)N(R), ($R^C$)$_2$NC(O), halogen atom, hydrogen atom, and combination thereof.

In an alternative embodiment, each of the ($C_1$-$C_{40}$)hydrocarbyl, ($C_1$-$C_{40}$)heterohydrocarbyl, Si($R^C$)$_3$, Ge($R^C$)$_3$, P($R^C$)$_2$, N($R^C$)$_2$, OR$^C$, SR$^C$, NO$_2$, CN, CF$_3$, $R^C$S(O), $R^C$S (O)$_2$, ($R^C$)$_2$C=N, $R^C$C(O)O, $R^C$OC(O), $R^C$C(O)N(R), ($R^C$)$_2$NC(O) groups independently is unsubstituted or substituted with one or more $R^S$ substituents, and wherein each $R^S$ independently is a halogen atom, polyfluoro substitution, perfluoro substitution, unsubstituted ($C_1$-$C_{18}$)alkyl, F$_3$C, FCH$_2$O, F$_2$HCO, F$_3$CO, ($R^C$)$_3$Si, ($R^C$)$_3$Ge, ($R^C$)O, ($R^C$)S, ($R^C$)S(O), ($R^C$)S(O)$_2$, ($R^C$)$_2$P, ($R^C$)$_2$N, ($R^C$)$_2$C=N, NC, ($R^C$)C(O)O, ($R^C$)OC(O), ($R^C$)C(O)N($R^C$), or ($R^C$)$_2$NC(O), or two of the $R^S$ are taken together to form an unsubstituted ($C_1$-$C_{18}$)alkylene, wherein each $R^S$ independently is an unsubstituted ($C_1$-$C_8$)alkyl.

In an alternative embodiment, each of the aryl, heteroaryl, hydrocarbyl, heterohydrocarbyl, Si($R^C$)$_3$, Ge($R^C$)$_3$, P($R^P$)$_2$, N($R^N$)$_2$, OR$^C$, SR$^C$, $R^C$S(O), $R^C$S(O)$_2$, ($R^C$)$_2$C=N, $R^C$C(O)O, $R^C$OC(O), $R^C$C(O)N(R), ($R^C$)$_2$NC(O), hydrocarbylene, and heterohydrocarbylene groups independently is unsubstituted or substituted with one or more $R^S$ substituents; and Each $R^S$ independently is a halogen atom, polyfluoro substitution, perfluoro substitution, unsubstituted ($C_1$-$C_{18}$) alkyl, F$_3$C, FCH$_2$O, F$_2$HCO, F$_3$CO, R$_3$Si, R$_3$Ge, RO, RS, RS(O), RS(O)$_2$, R$_2$P, R$_2$N, R$_2$C=N, NC, RC(O)O, ROC(O), RC(O)N(R), or R$_2$NC(O), or two of the $R^S$ are taken together to form an unsubstituted ($C_1$-$C_{18}$)alkylene, wherein each R independently is an unsubstituted ($C_1$-$C_{18}$)alkyl.

In some embodiments, each of the chemical groups (e.g., X, L, $R^{1-16}$, etc.) of the metal-ligand complex of formula (I) may be unsubstituted, that is, can be defined without use of a substituent $R^S$, provided the above-mentioned conditions are satisfied. In other embodiments, at least one of the chemical groups of the metal-ligand complex of formula (I) independently contain one or more of the substituents $R^S$. Preferably, accounting for all chemical groups, there are not more than a total of 20 $R^S$, more preferably not more than a total of 10 $R^S$, and still more preferably not more than a total of 5 $R^S$ in the metal-ligand complex of formula (I). Where the invention compound contains two or more substituents $R^S$, each $R^S$ independently is bonded to a same or different substituted chemical group. When two or more $R^S$ are bonded to a same chemical group, they independently are bonded to a same or different carbon atom or heteroatom, as the case may be, in the same chemical group up to and including persubstitution of the chemical group.

The term "persubstitution" means each hydrogen atom (H) bonded to a carbon atom or heteroatom of a corresponding unsubstituted compound or functional group, as the case may be, is replaced by a substituent (e.g., $R^S$). The term "polysubstitution" means each of at least two, but not all, hydrogen atoms (H) bonded to carbon atoms or heteroatoms of a corresponding unsubstituted compound or functional group, as the case may be, is replaced by a substituent (e.g., $R^S$). The ($C_1$-$C_{18}$)alkylene and ($C_1$-$C_8$)alkylene substituents are especially useful for forming substituted chemical groups that are bicyclic or tricyclic analogs, as the case may be, of corresponding monocyclic or bicyclic unsubstituted chemical groups.

As used herein, the term "($C_1$-$C_{40}$)hydrocarbyl" means a hydrocarbon radical of from 1 to 40 carbon atoms and the term "($C_1$-$C_{40}$)hydrocarbylene" means a hydrocarbon diradical of from 1 to 40 carbon atoms, wherein each hydrocarbon radical and diradical independently is aromatic (6 carbon atoms or more) or non-aromatic, saturated or unsaturated, straight chain or branched chain, cyclic (including mono- and poly-cyclic, fused and non-fused polycyclic, including bicyclic; 3 carbon atoms or more) or acyclic, or a combination of two or more thereof; and each hydrocarbon radical and diradical independently is the same as or different from another hydrocarbon radical and diradical, respectively, and independently is unsubstituted or substituted by one or more $R^S$.

Preferably, a $(C_1-C_{40})$hydrocarbyl independently is an unsubstituted or substituted $(C_1-C_{40})$alkyl, $(C_3-C_{40})$cycloalkyl, $(C_3-C_{20})$cycloalkyl-$(C_1-C_{20})$alkylene, $(C_6-C_{40})$aryl, or $(C_6-C_{20})$aryl-$(C_1-C_{20})$alkylene. More preferably, each of the aforementioned $(C_1-C_{40})$hydrocarbyl groups independently has a maximum of 20 carbon atoms (i.e., $(C_1-C_{20})$hydrocarbyl), and still more preferably a maximum of 12 carbon atoms.

The terms "$(C_1-C_{40})$alkyl" and "$(C_1-C_{18})$alkyl" mean a saturated straight or branched hydrocarbon radical of from 1 to 40 carbon atoms or from 1 to 18 carbon atoms, respectively, that is unsubstituted or substituted by one or more $R^S$. Examples of unsubstituted $(C_1-C_{40})$alkyl are unsubstituted $(C_1-C_{20})$alkyl; unsubstituted $(C_1-C_{10})$alkyl; unsubstituted $(C_1-C_5)$alkyl; methyl; ethyl; 1-propyl; 2-propyl; 1-butyl; 2-butyl; 2-methylpropyl; 1,1-dimethylethyl; 1-pentyl; 1-hexyl; 1-heptyl; 1-nonyl; and 1-decyl. Examples of substituted $(C_1-C_{40})$alkyl are substituted $(C_1-C_{20})$alkyl, substituted $(C_1-C_{10})$alkyl, trifluoromethyl, and $(C_{45})$alkyl. The $(C_{45})$alkyl is, for example, a $(C_{27}-C_{40})$alkyl substituted by one $R^S$, which is a $(C_{18}-C_5)$alkyl, respectively. Preferably, each $(C_1-C_5)$alkyl independently is methyl, trifluoromethyl, ethyl, 1-propyl, 1-methylethyl, or 1,1-dimethylethyl.

The term "$(C_6-C_{40})$aryl" means an unsubstituted or substituted (by one or more $R^S$) mono-, bi- or tricyclic aromatic hydrocarbon radical of from 6 to 40 carbon atoms, of which at least from 6 to 14 of the carbon atoms are aromatic ring carbon atoms, and the mono-, bi- or tricyclic radical comprises 1, 2 or 3 rings, respectively; wherein the 1 ring is aromatic and the 2 or 3 rings independently are fused or non-fused and at least one of the 2 or 3 rings is aromatic. Examples of unsubstituted $(C_6-C_{40})$aryl are unsubstituted $(C_6-C_{20})$aryl; unsubstituted $(C_6-C_{18})$aryl; 2-$(C_1-C_5)$alkyl-phenyl; 2,4-bis$(C_1-C_5)$alkyl-phenyl; phenyl; fluorenyl; tetrahydrofluorenyl; indacenyl; hexahydroindacenyl; indenyl; dihydroindenyl; naphthyl; tetrahydronaphthyl; and phenanthrene. Examples of substituted $(C_6-C_{40})$aryl are substituted $(C_6-C_{20})$aryl; substituted $(C_6-C_{18})$aryl; 2,4-bis[$(C_{20})$alkyl]-phenyl; polyfluorophenyl; pentafluorophenyl; and fluoren-9-one-1-yl.

The term "$(C_3-C_{40})$cycloalkyl" means a saturated cyclic hydrocarbon radical of from 3 to 40 carbon atoms that is unsubstituted or substituted by one or more $R^S$. Other cycloalkyl groups (e.g., $(C_3-C_{12})$alkyl)) are defined in an analogous manner. Examples of unsubstituted $(C_3-C_{40})$cycloalkyl are unsubstituted $(C_3-C_{20})$cycloalkyl, unsubstituted $(C_3-C_{10})$cycloalkyl, cyclopropyl, cyclobutyl, cyclopentyl, cyclohexyl, cycloheptyl, cyclooctyl, cyclononyl, and cyclodecyl. Examples of substituted $(C_3-C_{40})$cycloalkyl are substituted $(C_3-C_{20})$cycloalkyl, substituted $(C_3-C_{10})$cycloalkyl, cyclopentanon-2-yl, and 1-fluorocyclohexyl.

Examples of $(C_1-C_{40})$hydrocarbylene are unsubstituted or substituted $(C_6-C_{40})$arylene, $(C_3-C_{40})$cycloalkylene, and $(C_1-C_{40})$alkylene (e.g., $(C_1-C_{20})$alkylene). In some embodiments, the diradicals are a same carbon atom (e.g., —$CH_2$—) or on adjacent carbon atoms (i.e., 1,2-diradicals), or are spaced apart by one, two, or more intervening carbon atoms (e.g., respective 1,3-diradicals, 1,4-diradicals, etc.). Preferred is a 1,2-, 1,3-, 1,4-, or an alpha,omega-diradical, and more preferably a 1,2-diradical. The alpha, omega-diradical is a diradical that has maximum carbon backbone spacing between the radical carbons. More preferred is a 1,2-diradical, 1,3-diradical, or 1,4-diradical version of $(C_6-C_{18})$arylene, $(C_3-C_{20})$cycloalkylene, or $(C_2-C_{20})$alkylene.

The term "$(C_1-C_{40})$alkylene" means a saturated straight chain or branched chain diradical (i.e., the radicals are not on ring atoms) of from 1 to 40 carbon atoms that is unsubstituted or substituted by one or more $R^S$. Examples of unsubstituted $(C_1-C_{40})$alkylene are unsubstituted $(C_1-C_{20})$alkylene, including unsubstituted 1,2-$(C_2-C_{10})$alkylene; 1,3-$(C_3-C_{10})$alkylene; 1,4-$(C_4-C_{10})$alkylene; —$CH_2$—, —$CH_2CH_2$—, —$(CH_2)_3$—, —$CH_2CHCH_3$, —$(CH_2)_4$—, —$(CH_2)_5$—, —$(CH_2)_6$—, —$(CH_2)_7$—, —$(CH_2)_8$—, and —$(CH_2)_4C(H)(CH_3)$—. Examples of substituted $(C_1-C_{40})$alkylene are substituted $(C_1-C_{20})$alkylene, —$CF_2$—, —$C(O)$—, and —$(CH_2)_{14}C(CH_3)_2(CH_2)_5$— (i.e., a 6,6-dimethyl substituted normal-1,20-eicosylene). Since as mentioned previously two $R^S$ may be taken together to form a $(C_1-C_{18})$alkylene, examples of substituted $(C_1-C_{40})$alkylene also include 1,2-bis(methylene)cyclopentane, 1,2-bis(methylene)cyclohexane, 2,3-bis(methylene)-7,7-dimethyl-bicyclo[2.2.1]heptane, and 2,3-bis(methylene)bicyclo[2.2.2]octane.

The term "$(C_3-C_{40})$cycloalkylene" means a cyclic diradical (i.e., the radicals are on ring atoms) of from 3 to 40 carbon atoms that is unsubstituted or substituted by one or more $R^S$. Examples of unsubstituted $(C_3-C_{40})$cycloalkylene are 1,3-cyclopropylene, 1,1-cyclopropylene, and 1,2-cyclohexylene. Examples of substituted $(C_3-C_{40})$cycloalkylene are 2-oxo-1,3-cyclopropylene and 1,2-dimethyl-1,2-cyclohexylene.

The term "$(C_1-C_{40})$heterohydrocarbyl" means a heterohydrocarbon radical of from 1 to 40 carbon atoms and the term "$(C_1-C_{40})$heterohydrocarbylene means a heterohydrocarbon diradical of from 1 to 40 carbon atoms, and each heterohydrocarbon independently has one or more heteroatoms O; S; S(O); S(O)$_2$; Si$(R^C)_2$; Ge$(R^C)_2$; P$(R^P)$; and N$(R^N)$, wherein independently each $R^C$ is unsubstituted $(C_1-C_{18})$hydrocarbyl, each $R^P$ is unsubstituted $(C_1-C_{18})$hydrocarbyl; and each $R^N$ is unsubstituted $(C_1-C_{18})$hydrocarbyl or absent (e.g., absent when N comprises —N= or tri-carbon substituted N). The heterohydrocarbon radical and each of the heterohydrocarbon diradicals independently is on a carbon atom or heteroatom thereof, although preferably is on a carbon atom when bonded to a heteroatom in formula (II) or to a heteroatom of another heterohydrocarbyl or heterohydrocarbylene. Each $(C_1-C_{40})$heterohydrocarbyl and $(C_1-C_{40})$heterohydrocarbylene independently is unsubstituted or substituted (by one or more $R^S$), aromatic or non-aromatic, saturated or unsaturated, straight chain or branched chain, cyclic (including mono- and poly-cyclic, fused and non-fused polycyclic) or acyclic, or a combination of two or more thereof; and each is respectively the same as or different from another.

Preferably, the $(C_1-C_{40})$heterohydrocarbyl independently is unsubstituted or substituted $(C_1-C_{40})$heteroalkyl, $(C_1-C_{40})$hydrocarbyl-O—, $(C_1-C_{40})$hydrocarbyl-S—, $(C_1-C_{40})$hydrocarbyl-S(O)—, $(C_1-C_{40})$hydrocarbyl-S(O)$_2$—, $(C_1-C_{40})$hydrocarbyl-Si$(R^C)_2$—, $(C_1-C_{40})$hydrocarbyl-Ge$(R^C)_2$—, $(C_1-C_{40})$hydrocarbyl-N$(R^N)$—, $(C_1-C_{40})$hydrocarbyl-P$(R^P)$—, $(C_2-C_{40})$heterocycloalkyl, $(C_2-C_{19})$heterocycloalkyl-$(C_1-C_{20})$alkylene, $(C_3-C_{20})$cycloalkyl-$(C_1-C_9)$heteroalkylene, $(C_2-C_{19})$heterocycloalkyl-$(C_1-C_{20})$heteroalkylene, $(C_1-C_{40})$heteroaryl, $(C_1-C_{19})$heteroaryl-$(C_1-C_{20})$alkylene, $(C_6-C_{20})$aryl-$(C_1-C_{19})$heteroalkylene, or $(C_1-C_{19})$heteroaryl-$(C_1-C_{20})$heteroalkylene. The term "$(C_4-C_{40})$heteroaryl" means an unsubstituted or substituted (by one or more $R^S$) mono-, bi- or tricyclic heteroaromatic hydrocarbon radical of from 1 to 40 total carbon atoms and from 1 to 4 heteroatoms, and the mono-, bi- or tricyclic radical comprises 1, 2 or 3 rings, respectively, wherein the 2 or 3 rings independently are fused or non-fused and at least one of the 2 or 3 rings is heteroaromatic. Other heteroaryl groups (e.g., $(C_4-C_{12})$heteroaryl)) are defined in an analogous manner. The monocyclic heteroaromatic hydrocarbon radical is a 5-membered or 6-membered ring. The 5-membered ring has from 1 to 4 carbon atoms and from 4 to 1 heteroatoms, respectively, each heteroatom being O, S, N, or P, and preferably O, S, or N. Examples of 5-membered ring heteroaromatic hydrocarbon radical are pyrrol-1-yl; pyrrol-2-yl; furan-3-yl; thiophen-2-yl; pyrazol-1-yl; isoxazol-2-yl; isothiazol-5-yl; imidazol-2-yl; oxazol-4-yl; thiazol-2-yl; 1,2,4-triazol-1-yl; 1,3,4-oxadiazol-2-yl; 1,3,4-thiadiazol-2-yl; tetrazol-1-yl; tetrazol-2-yl; and tetrazol-5-yl. The 6-membered ring has 4 or 5 carbon atoms and 2 or 1 heteroatoms, the heteroatoms being N or P, and preferably N. Examples of 6-membered ring heteroaromatic hydrocarbon radical are pyridine-2-yl; pyrimidin-2-yl; and pyrazin-2-yl. The bicyclic heteroaromatic hydrocarbon radical preferably is a fused 5,6- or 6,6-ring system. Examples of the fused 5,6-ring system bicyclic heteroaromatic hydrocarbon radical are indol-1-yl; and benzimidazole-1-yl. Examples of the fused 6,6-ring system bicyclic heteroaromatic hydrocarbon radical are quinolin-2-yl; and isoquinolin-1-yl. The tricyclic heteroaromatic hydrocarbon radical preferably is a fused 5,6,5-; 5,6,6-; 6,5,6-; or 6,6,6-ring system. An example of the fused 5,6,5-ring system is 1,7-dihydropyrrolo[3,2-f]indol-1-yl. An example of the fused 5,6,6-ring system is 1H-benzo[f]indol-1-yl. An example of the fused 6,5,6-ring system is 9H-carbazol-9-yl. An example of the fused 6,5,6-ring system is 9H-carbazol-9-yl. An example of the fused 6,6,6-ring system is acrydin-9-yl.

In some embodiments the $(C_4-C_{40})$heteroaryl is 2,7-disubstituted carbazolyl or 3,6-disubstituted carbazolyl, more preferably wherein each $R^S$ independently is phenyl, methyl, ethyl, isopropyl, or tertiary-butyl, still more preferably 2,7-di(tertiary-butyl)-carbazolyl, 3,6-di(tertiary-butyl)-carbazolyl, 2,7-di(tertiary-octyl)-carbazolyl, 3,6-di(tertiary-octyl)-carbazolyl, 2,7-diphenylcarbazolyl, 3,6-diphenylcarbazolyl, 2,7-bis(2,4,6-trimethylphenyl)-carbazolyl or 3,6-bis(2,4,6-trimethylphenyl)-carbazolyl.

The aforementioned heteroalkyl and heteroalkylene groups are saturated straight or branched chain radicals or diradicals, respectively, containing $(C_1-C_{40})$ carbon atoms, or fewer carbon atoms as the case may be, and one or more of the heteroatoms Si$(R^C)_2$, Ge$(R^C)_2$, P$(R^P)$, N$(R^N)$, N, O, S, S(O), and S(O)$_2$ as defined above, wherein each of the heteroalkyl and heteroalkylene groups independently are unsubstituted or substituted by one or more $R^S$.

Examples of unsubstituted $(C_2-C_{40})$heterocycloalkyl are unsubstituted $(C_2-C_{20})$heterocycloalkyl, unsubstituted $(C_2-C_{10})$heterocycloalkyl, aziridin-1-yl, oxetan-2-yl, tetrahydrofuran-3-yl, pyrrolidin-1-yl, tetrahydrothiophen-S,S-dioxide-2-yl, morpholin-4-yl, 1,4-dioxan-2-yl, hexahydroazepin-4-yl, 3-oxa-cyclooctyl, 5-thio-cyclononyl, and 2-azacyclodecyl.

The term "halogen atom" means fluorine atom (F), chlorine atom (Cl), bromine atom (Br), or iodine atom (I) radical. Preferably each halogen atom independently is the Br, F, or Cl radical, and more preferably the F or Cl radical. The term "halide" means fluoride (F$^-$), chloride (Cl$^-$), bromide (Br$^-$), or iodide (I$^-$) anion.

Unless otherwise indicated herein the term "heteroatom" means O, S, S(O), S(O)$_2$, Si$(R^C)_2$, Ge$(R^C)_2$, P$(R^P)$, or N$(R^N)$, wherein independently each $R^C$ is unsubstituted $(C_1-C_{18})$hydrocarbyl, each $R^P$ is unsubstituted $(C_1-C_{18})$hydrocarbyl; and each $R^N$ is unsubstituted $(C_1-C_{18})$hydrocarbyl or absent (absent when N comprises —N=). Preferably there is no germanium (Ge) atom in the invention compound or complex.

Preferably, there are no O—O, S—S, or O—S bonds, other than O—S bonds in an S(O) or S(O)$_2$ diradical functional group, in the metal-ligand complex of formula (I). More preferably, there are no O—O, N—N, P—P, N—P, S—S, or O—S bonds, other than O—S bonds in an S(O) or S(O)$_2$ diradical functional group, in the metal-ligand complex of formula (II).

The term "saturated" means lacking carbon-carbon double bonds, carbon-carbon triple bonds, and (in heteroatom-containing groups) carbon-nitrogen, carbon-phosphorous, and carbon-silicon double bonds. Where a saturated chemical group is substituted by one or more substituents $R^S$, one or more double and/or triple bonds optionally may or may not be present in substituents $R^S$. The term "unsaturated" means containing one or more carbon-carbon double bonds, carbon-carbon triple bonds, and (in heteroatom-containing groups) carbon-nitrogen, carbon-phosphorous, and carbon-silicon double bonds, not including any such double bonds that may be present in substituents $R^S$, if any, or in (hetero)aromatic rings, if any.

M is titaniunm, zirconium, or hafnium. In one embodiment, M is zirconium or hafnium, and in another embodiment M is hafnium. In some embodiments, M is in a formal oxidation state of +2, +3, or +4. In some embodiments, n is 0, 1, 2, or 3. Each X independently is a monodentate ligand that is neutral, monoanionic, or dianionic; or two Xs are taken together to form a bidentate ligand that is neutral, monoanionic, or dianionic. X and n are chosen in such a way that the metal-ligand complex of formula (II) is, overall, neutral. In some embodiments each X independently is the monodentate ligand. In one embodiment when there are two or more X monodentate ligands, each X is the same. In some embodiments the monodentate ligand is the monoanionic ligand. The monoanionic ligand has a net formal oxidation state of −1. Each monoanionic ligand may independently be hydride, $(C_1-C_{40})$hydrocarbyl carbanion, $(C_1-C_{40})$heterohydrocarbyl carbanion, halide, nitrate, carbonate, phosphate, sulfate, HC(O)O$^-$, $(C_1-C_{40})$hydrocarbylC(O)O$^-$, HC(O)N(H)$^-$, $(C_1-C_{40})$hydrocarbylC(O)N(H)$^-$, $(C_1-C_{40})$hydrocarbylC(O)N(($C_1-C_{20}$)hydrocarbyl)$^-$, $R^KR^LB^-$, $R^KR^LN^-$, $R^KO^-$, $R^KS^-$, $R^KR^LP^-$, or $R^MR^KR^LSi^-$, wherein each $R^K$, $R^L$, and $R^M$ independently is hydrogen, $(C_1-C_{40})$hydrocarbyl, or $(C_1-C_{40})$heterohydrocarbyl, or $R^K$ and $R^L$ are taken together to form a $(C_2-C_{40})$hydrocarbylene or $(C_1-C_{40})$heterohydrocarbylene and $R^M$ is as defined above.

In some embodiments at least one monodentate ligand of X independently is the neutral ligand. In one embodiment, the neutral ligand is a neutral Lewis base group that is $R^X NR^K R^L$, $R^K OR^L$, $R^K SR^L$, or $R^X PR^K R^L$, wherein each $R^X$ independently is hydrogen, $(C_1-C_{40})$hydrocarbyl, $[(C_1-C_{10})$hydrocarbyl$]_3$Si, $[(C_1-C_{10})$hydrocarbyl$]_3$Si$(C_1-C_{40})$hydrocarbyl, or $(C_1-C_{40})$heterohydrocarbyl and each $R^K$ and $R^L$ independently is as defined above.

In some embodiments, each X is a monodentate ligand that independently is a halogen atom, unsubstituted $(C_1-C_{20})$hydrocarbyl, unsubstituted $(C_1-C_{20})$hydrocarbylC(O)O—, or $R^K R^L N$— wherein each of $R^K$ and $R^L$ independently is an unsubstituted $(C_1-C_{20})$hydrocarbyl. In some embodiments each monodentate ligand X is a chlorine atom, $(C_1-C_{10})$hydrocarbyl (e.g., $(C_1-C_6)$alkyl or benzyl), unsubstituted $(C_1-C_{10})$hydrocarbylC(O)O—, or $R^K R^L N$— wherein each of $R^K$ and $R^L$ independently is an unsubstituted $(C_1-C_{10})$hydrocarbyl.

In some embodiments there are at least two X and the two X are taken together to form the bidentate ligand. In some embodiments the bidentate ligand is a neutral bidentate ligand. In one embodiment, the neutral bidentate ligand is a diene of formula $(R^D)_2C=C(R^D)-C(R^D)=C(R^D)_2$, wherein each $R^D$ independently is H, unsubstituted $(C_1-C_6)$ alkyl, phenyl, or naphthyl. In some embodiments the bidentate ligand is a monoanionic-mono(Lewis base) ligand. The monoanionic-mono(Lewis base) ligand may be a 1,3-dionate of formula (D): $R^E-C(O^-)=CH-C(=O)-R^E$ (D), wherein each $R^D$ independently is H, unsubstituted $(C_1-C_6)$ alkyl, phenyl, or naphthyl. In some embodiments the bidentate ligand is a dianionic ligand. The dianionic ligand has a net formal oxidation state of −2. In one embodiment, each dianionic ligand independently is carbonate, oxalate (i.e., $^-O_2CC(O)O^-$), $(C_2-C_{40})$hydrocarbylene dicarbanion, $(C_1-C_{40})$heterohydrocarbylene dicarbanion, phosphate, or sulfate.

As previously mentioned, number and charge (neutral, monoanionic, dianionic) of X are selected depending on the formal oxidation state of M such that the metal-ligand complex of formula (I) is, overall, neutral.

In some embodiments each X is the same, wherein each X is methyl; ethyl; 1-propyl; 2-propyl; 1-butyl; 2,2,-dimethylpropyl; trimethylsilylmethyl; phenyl; benzyl; or chloro. In some embodiments n is 2 and each X is the same.

In some embodiments at least two X are different. In some embodiments n is 2 and each X is a different one of methyl; ethyl; 1-propyl; 2-propyl; 1-butyl; 2,2,-dimethylpropyl; trimethylsilylmethyl; phenyl; benzyl; and chloro.

The integer n indicates number of X. In one embodiment, n is 2 or 3 and at least two X independently are monoanionic monodentate ligands and a third X, if present, is a neutral monodentate ligand. In some embodiments n is 2 at two X are taken together to form a bidentate ligand. In some embodiments, the bidentate ligand is 2,2-dimethyl-2-silapropane-1,3-diyl or 1,3-butadiene.

In some embodiments, each Z independently is O, S, $N(C_1-C_{40})$hydrocarbyl, or $P(C_1-C_{40})$hydrocarbyl. In some embodiments each Z is different. In some embodiments one Z is O and one Z is NCH$_3$. In some embodiments one Z is O and one Z is S. In some embodiments one Z is S and one Z is $N(C_1-C_{40})$hydrocarbyl (e.g., NCH$_3$). In some embodiments each Z is the same. In some embodiments each Z is O. In some embodiments each Z is S. In some embodiments each Z is $N(C_1-C_{40})$hydrocarbyl (e.g., NCH$_3$). In some embodiments at least one, and in some embodiments each Z is $P(C_1-C_{40})$hydrocarbyl (e.g., PCH$_3$).

In some embodiments, L is $(C_3-C_{40})$hydrocarbylene or (3 to 40 atom, wherein such atm is not H)heterohydrocarbylene, wherein the $(C_3-C_{40})$hydrocarbylene has a portion that comprises a 3-carbon atom to 10-carbon atom linker backbone linking the Z atoms in formula (II) (to which L is bonded) and the (3 to 40 atom, wherein such atom is not H)heterohydrocarbylene has a portion that comprises a 3-atom to 10-atom linker backbone linking the Z atoms in formula (II), wherein each of the from 3 to 10 atoms of the 3-atom to 10-atom linker backbone of the (3 to 40 atom, wherein such atm is not H)heterohydrocarbylene independently is a carbon atom or heteroatom, wherein each heteroatom independently is $C(R^C)_2$, O, S, S(O), S(O)$_2$, Si$(R^C)_2$, Ge$(R^C)_2$, P$(R^P)$, or N$(R^N)$, wherein independently each $R^C$ is $(C_1-C_{30})$hydrocarbyl, each $R^P$ is $(C_1-C_{30})$hydrocarbyl; and each $R^N$ is $(C_1-C_{30})$hydrocarbyl or absent. In some embodiments L is the $(C_3-C_{40})$hydrocarbylene. Preferably the aforementioned portion that comprises a 3-carbon atom to 10-carbon atom linker backbone of the $(C_3-C_{40})$ hydrocarbylene of L comprises a 3-carbon atom to 10-carbon atom, and more preferably a 3-carbon atom or 4-carbon atom linker backbone linking the Z atoms in formula (I) to which L is bonded. In some embodiments L comprises the 3-carbon atom linker backbone (e.g., L is —CH$_2$CH$_2$CH$_2$—; —CH(CH$_3$)CH$_2$CH(CH$_3$)—; —CH(CH$_3$)CH(CH$_3$)CH (CH$_3$)—; —CH$_2$C(CH$_3$)$_2$CH$_2$—); 1,3-cyclopentane-diyl; or 1,3-cyclohexane-diyl. In some embodiments L comprises the 4-carbon atom linker backbone (e.g., L is —CH$_2$CH$_2$CH$_2$CH$_2$—; —CH$_2$C(CH$_3$)$_2$C(CH$_3$)$_2$CH$_2$—; 1,2-bis(methylene)cyclohexane; or 2,3-bis(methylene)-bicyclo[2.2.2]octane). In some embodiments L comprises the 5-carbon atom linker backbone (e.g., L is —CH$_2$CH$_2$CH$_2$CH$_2$CH$_2$— or 1,3-bis(methylene)cyclohexane). In some embodiments L comprises the 6-carbon atom linker backbone (e.g., L is —CH$_2$CH$_2$CH$_2$CH$_2$CH$_2$CH$_2$— or 1,2-bis(ethylene)cyclohexane).

In some embodiments, L is the $(C_3-C_{40})$hydrocarbylene and the $(C_3-C_{40})$hydrocarbylene of L is a $(C_3-C_{12})$hydrocarbylene, and more preferably $(C_3-C_8)$hydrocarbylene. In some embodiments the $(C_3-C_{40})$hydrocarbylene is an unsubstituted $(C_3-C_{40})$alkylene. In some embodiments the $(C_3-C_{40})$hydrocarbylene is a substituted $(C_3-C_{40})$alkylene. In some embodiments the $(C_3-C_{40})$hydrocarbylene is an unsubstituted $(C_3-C_{40})$cycloalkylene or substituted $(C_3-C_{40})$cycloalkylene, wherein each substituent independently is $R^S$, wherein preferably the $R^S$ independently is $(C_1-C_4)$alkyl.

In some embodiments L is the unsubstituted $(C_3-C_{40})$ alkylene, and in some other embodiments, L is an acyclic unsubstituted $(C_3-C_{40})$alkylene, and still more preferably the acyclic unsubstituted $(C_2-C_{40})$alkylene is, —CH$_2$CH$_2$CH$_2$—, cis —CH(CH$_3$)CH$_2$CH(CH$_3$)—, trans —CH(CH$_3$)CH$_2$CH(CH$_3$)—, —CH(CH$_3$)CH$_2$CH(CH$_3$)$_2$—, —CH(CH$_3$)CH(CH$_3$)CH(CH$_3$)—, —CH$_2$C(CH$_3$)$_2$CH$_2$—, —CH$_2$CH$_2$CH$_2$CH$_2$—, or —CH$_2$C(CH$_3$)$_2$C(CH$_3$)$_2$CH$_2$—. In some embodiments L is trans-1,2-bis(methylene)cyclopentane, cis-1,2-bis(methylene)cyclopentane, trans-1,2-bis(methylene)cyclohexane, or cis-1,2-bis(methylene)cyclohexane. In some embodiments the $(C_1-C_{40})$alkylene-substituted $(C_1-C_{40})$alkylene is exo-2,3-bis(methylene) bicyclo[2.2.2]octane or exo-2,3-bis(methylene)-7,7-dimethyl-bicyclo[2.2.1]heptane. In some embodiments L is the unsubstituted $(C_3-C_{40})$cycloalkylene, and in some other embodiments, L is cis-1,3-cyclopentane-diyl or cis-1,3-cyclohexane-diyl. In some embodiments L is the substituted $(C_3-C_{40})$cycloalkylene, and more preferably L is a $(C_1-C_{40})$ alkylene-substituted $(C_3-C_{40})$cycloalkylene, and in some other embodiments, L is the $(C_1-C_{40})$alkylene-substituted $(C_3-C_{40})$cycloalkylene that is exo-bicyclo[2.2.2]octan-2,3-diyl.

In some embodiments L is the (3 to 40 atoms)heterohydrocarbylene. In some embodiments, the aforementioned portion that comprises a 3-atom to 6-atom linker backbone of the (3 to 40 atoms)heterohydrocarbylene of L comprises a from 3-atom to 5-atom, and in some other embodiments a 3-atom or 4-atom linker backbone linking the Z atoms in formula (I) to which L is bonded. In some embodiments L comprises the 3-atom linker backbone (e.g., L is —CH$_2$CH$_2$CH(OCH$_3$)—, —CH$_2$Si(CH$_3$)$_2$CH$_2$—, or —CH$_2$Ge(CH$_3$)$_2$CH$_2$—). The "—CH$_2$Si(CH$_3$)$_2$CH$_2$—" may be referred to herein as a 1,3-diradical of 2,2-dimethyl-2-silapropane. In some embodiments L comprises the 4-atom linker backbone (e.g., L is —CH$_2$CH$_2$OCH$_2$— or —CH$_2$P(CH$_3$)CH$_2$CH$_2$—). In some embodiments L comprises the 5-atom linker backbone (e.g., L is —CH$_2$CH$_2$OCH$_2$CH$_2$— or —CH$_2$CH$_2$N(CH$_3$)CH$_2$CH$_2$—). In some embodiments L comprises the 6-atom linker backbone (e.g., L is —CH$_2$CH$_2$C(OCH$_3$)$_2$CH$_2$CH$_2$CH$_2$—, —CH$_2$CH$_2$CH$_2$S(O)$_2$CH$_2$CH$_2$—, or —CH$_2$CH$_2$S(O)CH$_2$CH$_2$CH$_2$—). In some embodiments each of the 3 to 6 atoms of the 3-atom to 6-atom linker backbone is a carbon atom. In some embodiments at least one heteroatom is the $C(R^C)_2$. In some embodiments at least one heteroatom is the $Si(R^C)_2$. In some embodiments at least one heteroatom is the O. In some embodiments at least one heteroatom is the $N(R^N)$. In some embodiments, there are no O—O, S—S, or O—S bonds, other than O—S bonds in the S(O) or S(O)$_2$ diradical functional group, in —Z-L-Z—. In some other embodiments, there are no O—O, N—N, P—P, N—P, S—S, or O—S bonds, other than O—S bonds in an S(O) or S(O)$_2$ diradical functional group, in —Z-L-Z—. In some embodiments, the (3 to 40 atoms)heterohydrocarbylene is (3 to 11 atoms, excluding H)heterohydrocarbylene, and in some other embodiments (3 to 7 atoms)heterohydrocarbylene. In some embodiments the (3 to 7 atoms)heterohydrocarbylene of L is —CH$_2$Si(CH$_3$)$_2$CH$_2$—; —CH$_2$CH$_2$Si(CH$_3$)$_2$CH$_2$—; or CH$_2$Si(CH$_3$)$_2$CH$_2$CH$_2$—. In some embodiments, the $(C_1-C_7)$heterohydrocarbylene of L is —CH$_2$Si(CH$_3$)$_2$CH$_2$—, —CH$_2$Si(CH$_2$CH$_3$)$_2$CH$_2$—, —CH$_2$Si(isopropyl)$_2$CH$_2$—, —CH$_2$Si(tetramethylene)CH$_2$—, or —CH$_2$Si(pentamethylene)CH$_2$—. The —CH$_2$Si(tetramethylene)CH$_2$— is named 1-silacyclopentan-1,1-dimethylene. The —CH$_2$Si(pentamethylene)CH$_2$— is named 1-silacyclohexan-1,1-dimethylene.

In some embodiments the metal-ligand complex of Formula (II) is a metal-ligand complex of any one of the following formulas:

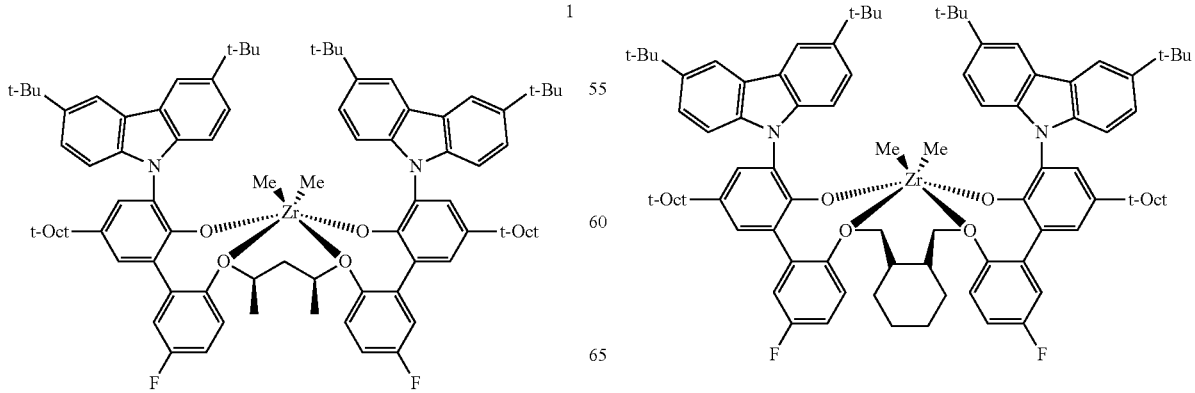

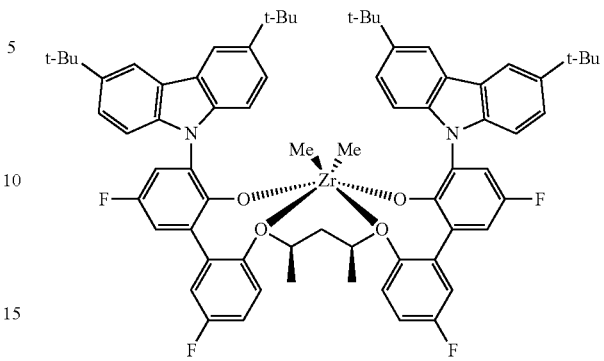

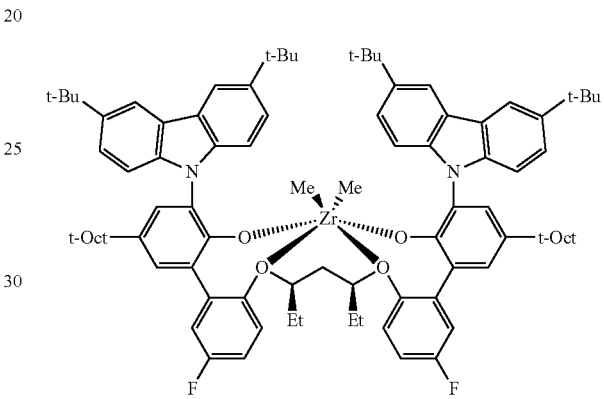

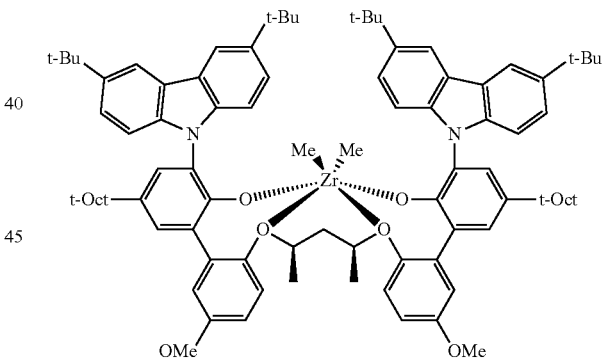

6
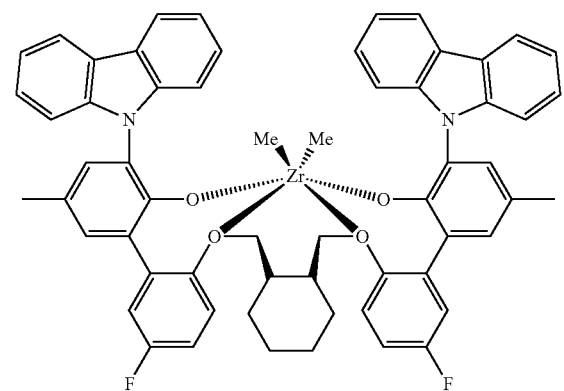
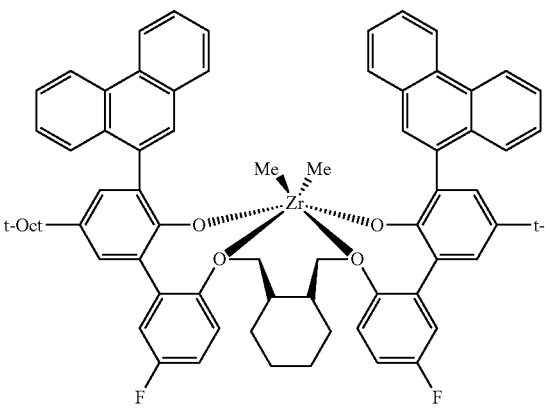
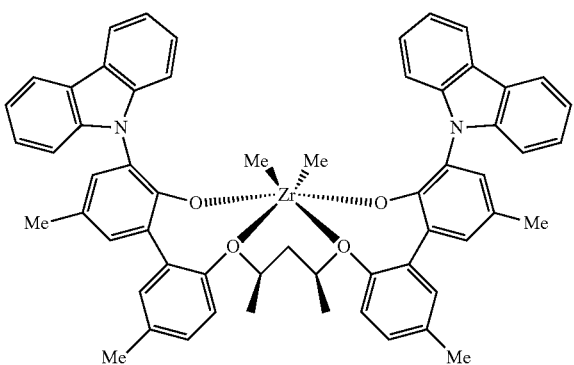
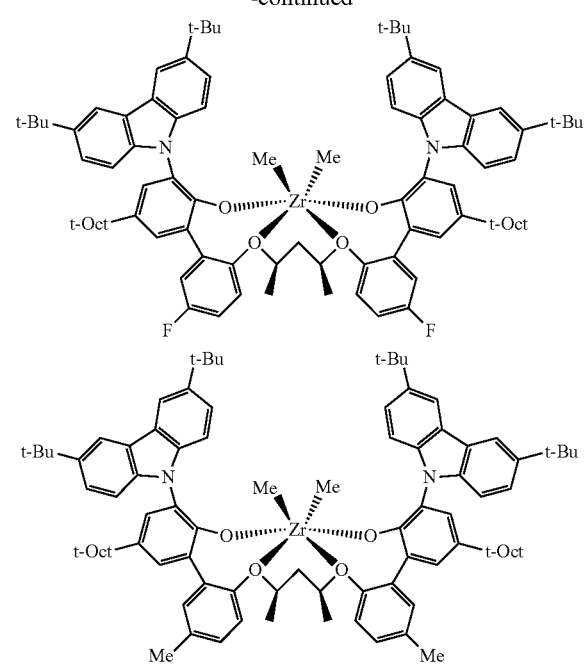
7
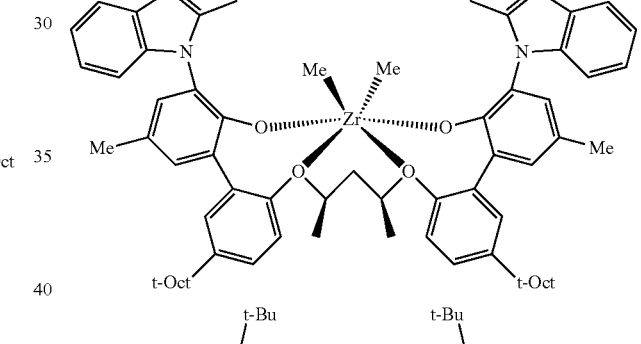
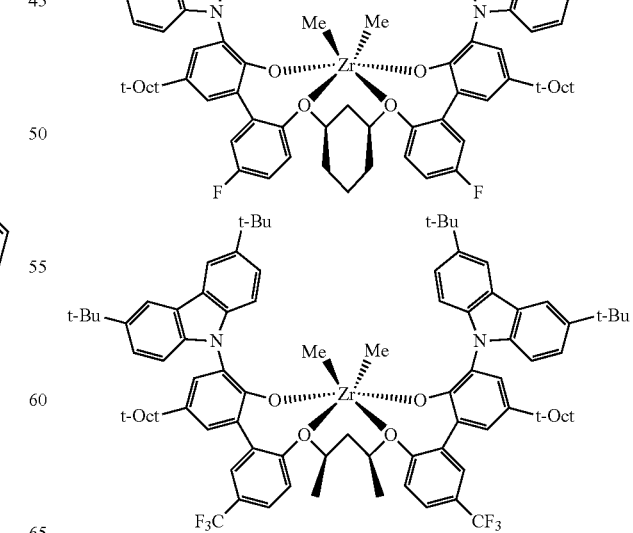

-continued
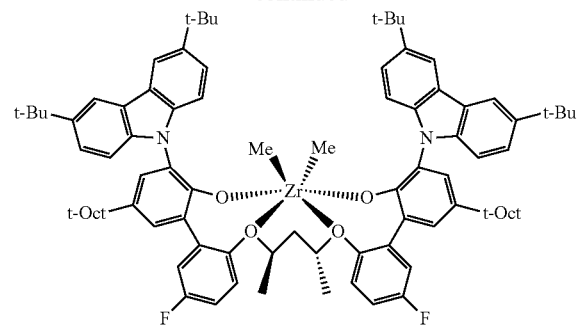
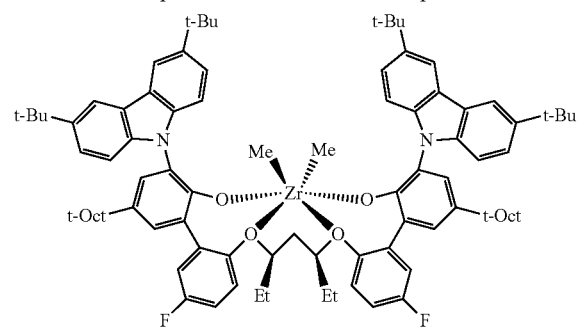
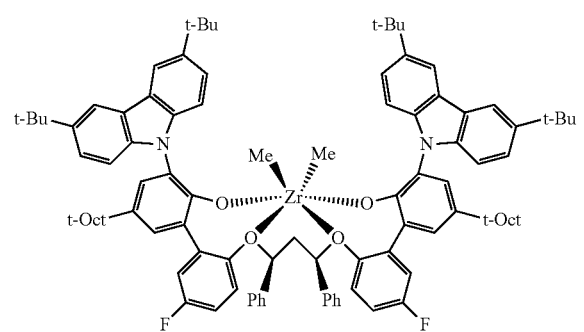
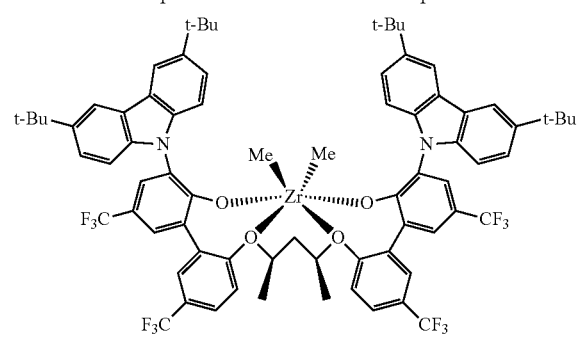
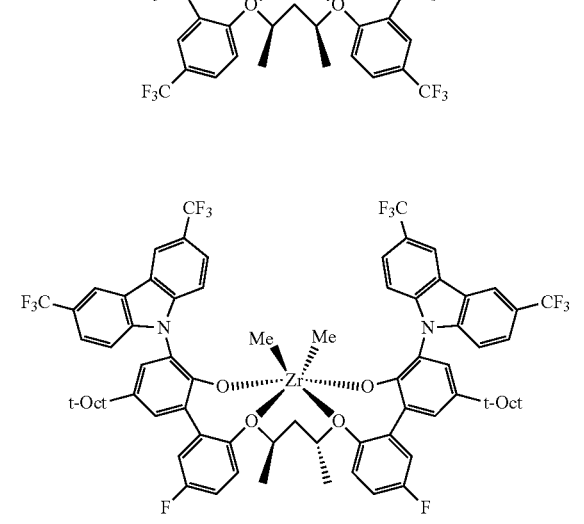
-continued
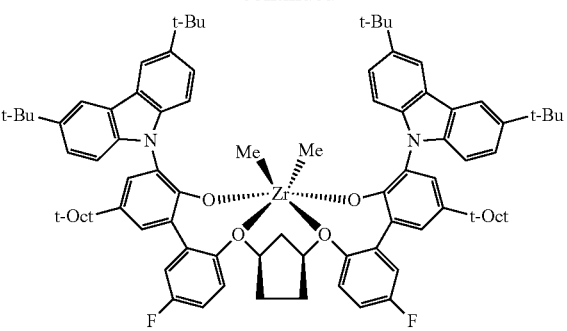
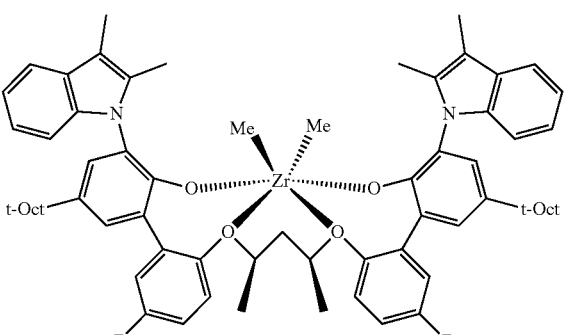
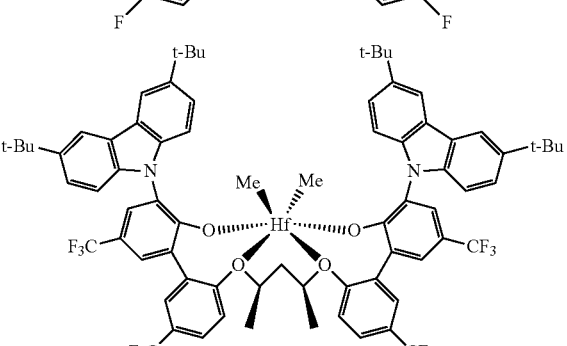
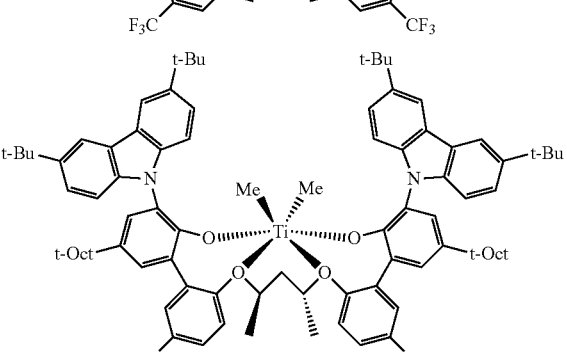
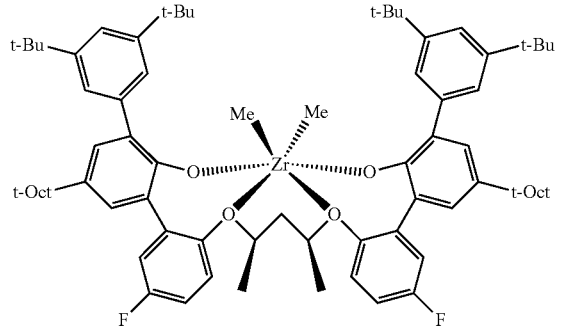

-continued
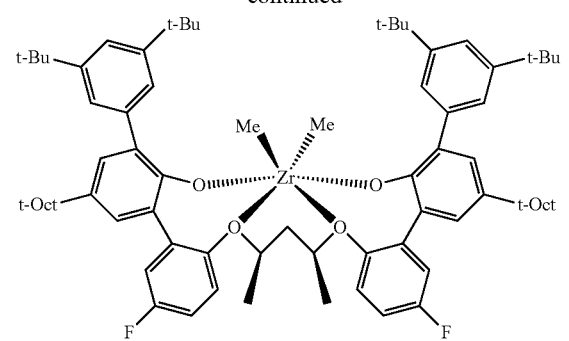
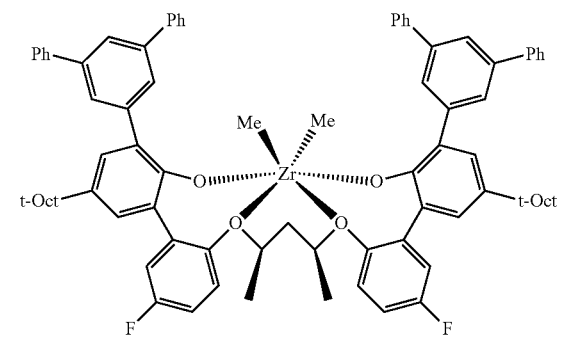
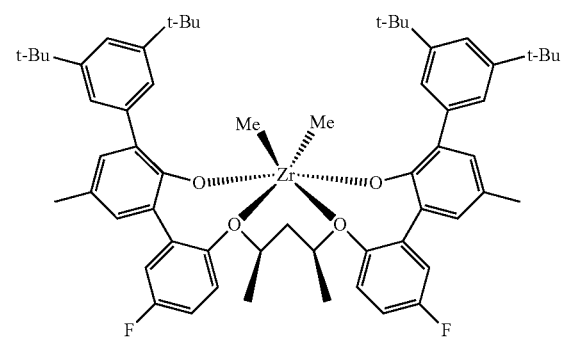
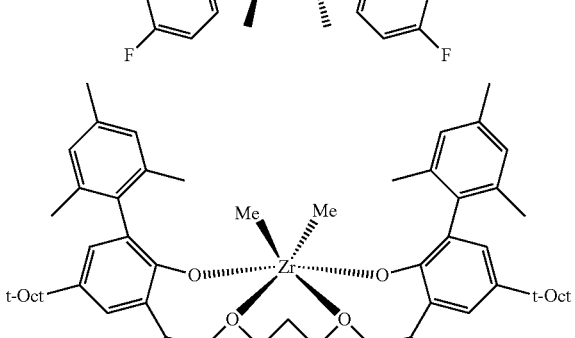
-continued
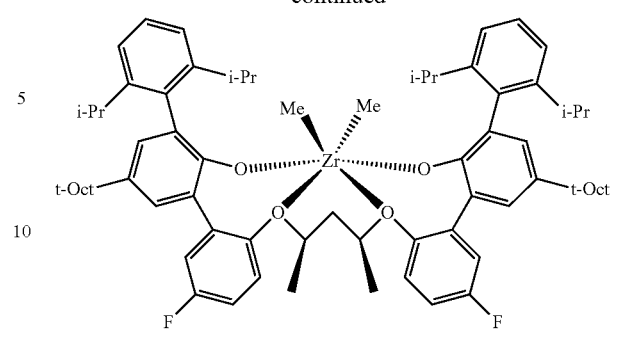
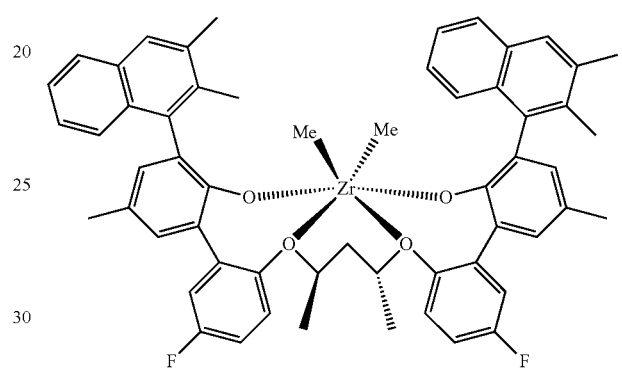
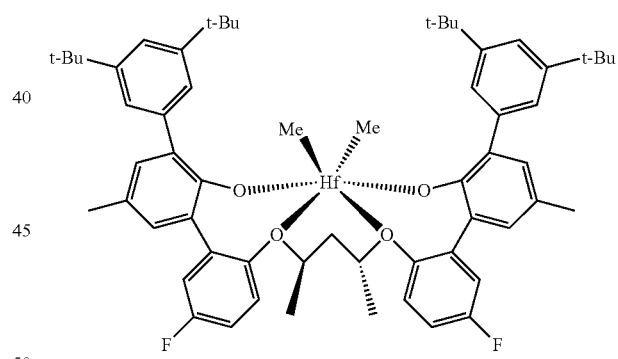
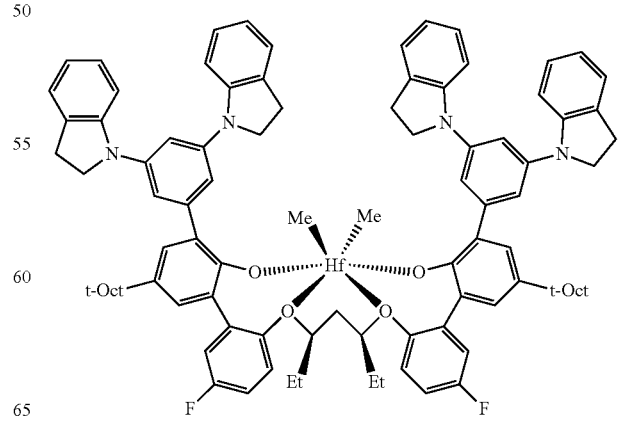

23
-continued
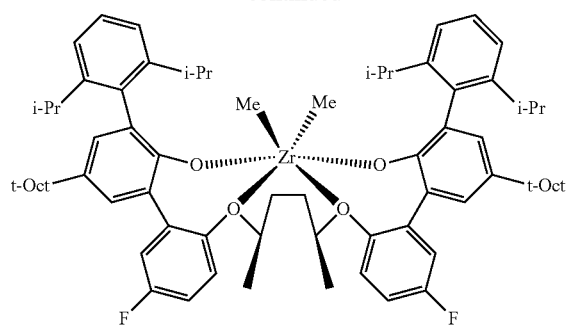
24
-continued
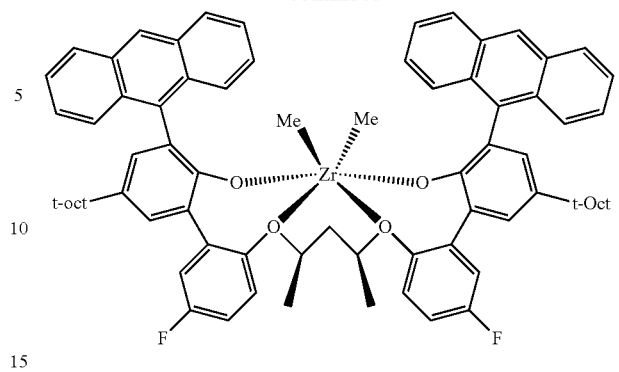
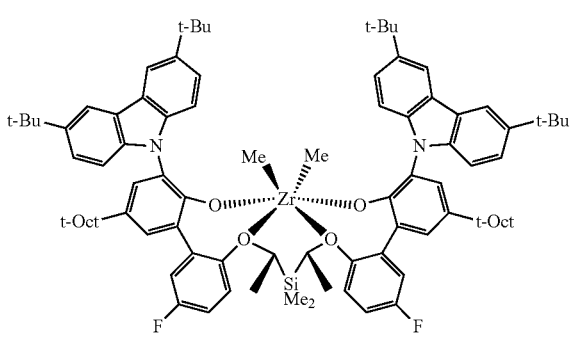
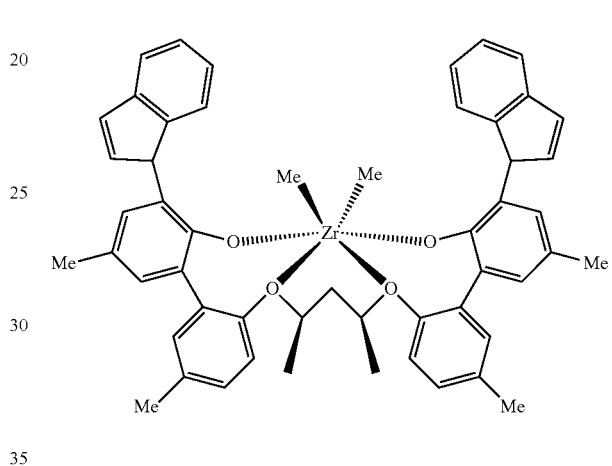
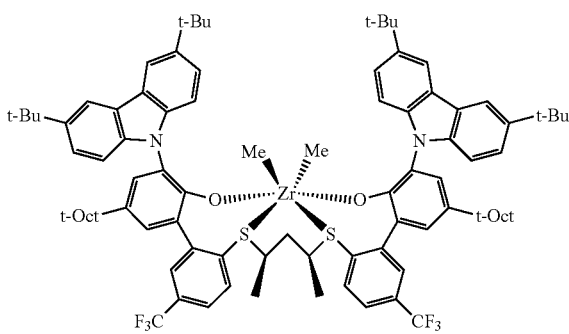
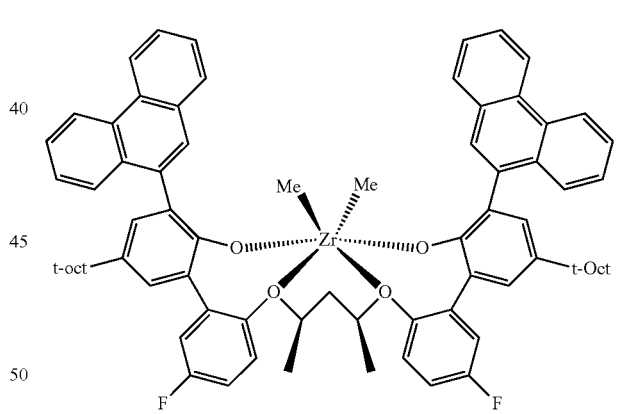
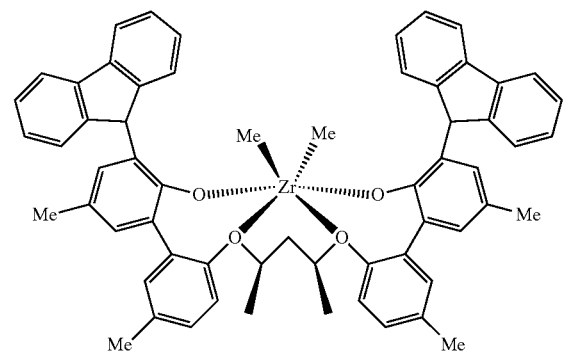
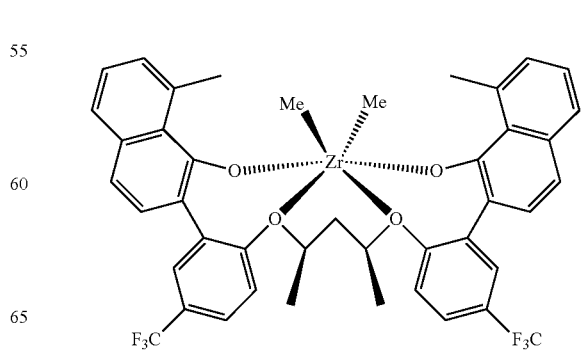

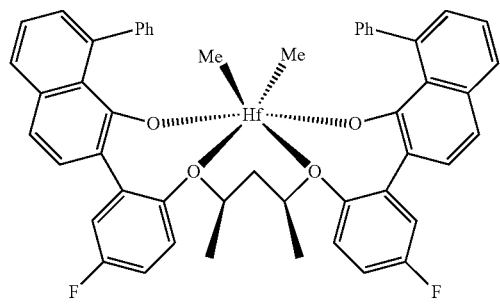

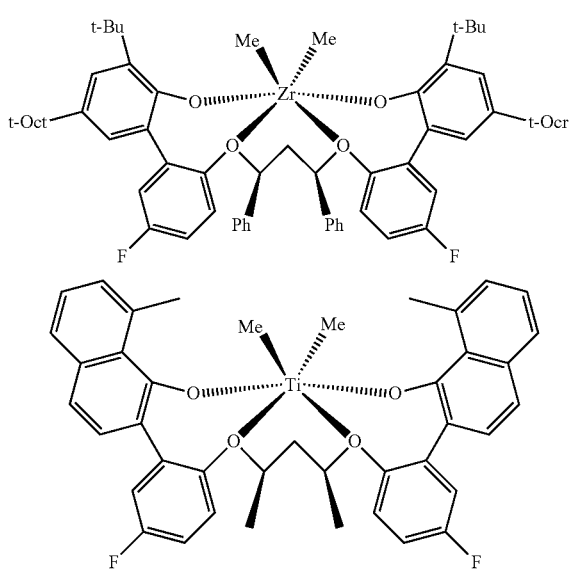

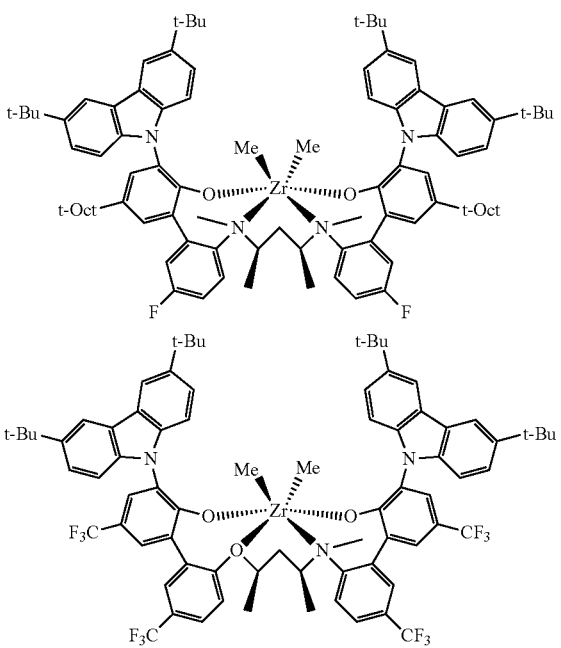

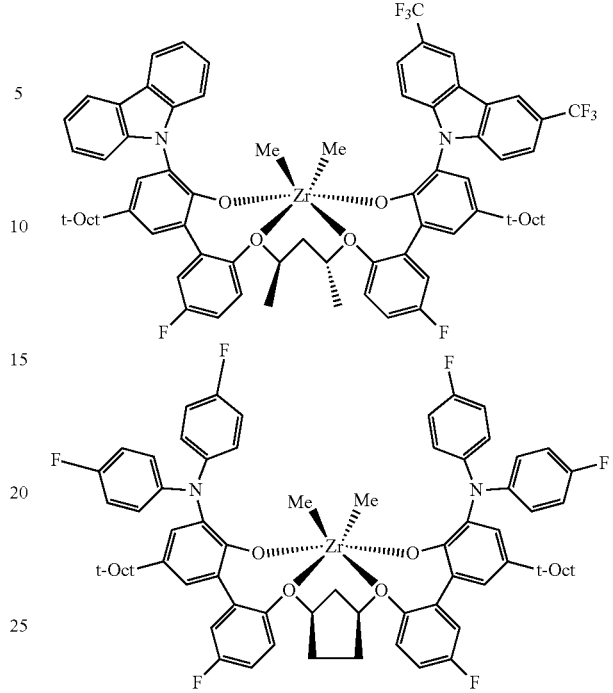

Co-Catalyst Component

The procatalyst comprising the metal-ligand complex of Formula (II) is rendered catalytically active by contacting it to, or combining it with, the activating co-catalyst or by using an activating technique such as those that are known in the art for use with metal-based olefin polymerization reactions. Suitable activating co-catalysts for use herein include neutral Lewis acids; and non-polymeric, non-coordinating, ion-forming compounds (including the use of such compounds under oxidizing conditions). A suitable activating technique is bulk electrolysis. Combinations of one or more of the foregoing activating co-catalysts and techniques are also contemplated. The inventive treated aluminum species can be used as activating co-catalysts in some embodiments. In some embodiments, exemplary compounds are tri(hydrocarbyl)-boron compounds. In some other embodiments, exemplary compounds are tri(($C_6$-$C_{18}$)aryl)boron compounds and halogenated (including perhalogenated) derivatives thereof. In some other embodiments, exemplary compounds are tris(fluoro-substituted phenyl)boranes, in other embodiments, tris(pentafluorophenyl)borane. In some embodiments, the activating co-catalyst is a tris(($C_1$-$C_{20}$)hydrocarbyl) borate (e.g., trityl tetrafluoroborate) or a tri(($C_1$-$C_{20}$)hydrocarbyl)ammonium tetra(($C_1$-$C_{20}$)hydrocarbyl)borane (e.g., bis(octadecyl)methylammonium tetrakis(pentafluorophenyl)borane). As used herein, the term "ammonium" means a nitrogen cation that is a (($C_1$-$C_{20}$)hydrocarbyl)$_2$N(H)$_2^+$, or ($C_1$-$C_{20}$)hydrocarbylN(H)$_3^+$, wherein each ($C_1$-$C_{20}$)hydrocarbyl may be the same or different.

Exemplary combinations of neutral Lewis acid activating co-catalysts include mixtures comprising a combination of a treated tri(($C_1$-$C_4$)alkyl)aluminum and a halogenated tri(($C_6$-$C_{18}$)aryl)boron compound, especially a tris(pentafluorophenyl)borane. Other exemplary embodiments are combinations of such neutral Lewis acid mixtures with a treated polymeric or oligomeric alumoxane, and combinations of a single neutral Lewis acid, especially tris(pentafluorophenyl)

borane with a treated polymeric or oligomeric alumoxane. Exemplary embodiments ratios of numbers of moles of (metal-ligand complex):(co-catalyst) [e.g., (Group 4 metal-ligand complex):(tris(pentafluoro-phenylborane)] are from 1:1 to 1:10, other exemplary embodiments are from 1:1 to 1:100.

Many activating co-catalysts and activating techniques have been previously taught with respect to different metal-ligand complexes in the following U.S. Pat. Nos. 5,064,802; 5,153,157; 5,296,433; 5,321,106; 5,350,723; 5,425,872; 5,625,087; 5,721,185; 5,783,512; 5,883,204; 5,919,983; 6,696,379; and 7,163,907. Examples of suitable hydrocarbyloxides are disclosed in U.S. Pat. No. 5,296,433. Examples of suitable Bronsted acid salts for addition polymerization catalysts are disclosed in U.S. Pat. Nos. 5,064,802; 5,919,983; 5,783,512. Examples of suitable salts of a cationic oxidizing agent and a non-coordinating, compatible anion as activating co-catalysts for addition polymerization catalysts are disclosed in U.S. Pat. No. 5,321,106. Examples of suitable carbenium salts as activating co-catalysts for addition polymerization catalysts are disclosed in U.S. Pat. No. 5,350,723. Examples of suitable silylium salts as activating co-catalysts for addition polymerization catalysts are disclosed in U.S. Pat. No. 5,625,087. Examples of suitable complexes of alcohols, mercaptans, silanols, and oximes with tris(pentafluorophenyl)borane are disclosed in U.S. Pat. No. 5,296,433. Some of these catalysts are also described in a portion of U.S. Pat. No. 6,515,155 B1 beginning at column 50, at line 39, and going through column 56, at line 55, only the portion of which is incorporated by reference herein.

In some embodiments, the procatalyst comprising the metal-ligand complex of Formula (II) may be activated to form an active catalyst composition by combination with one or more cocatalyst such as a cation forming cocatalyst, a strong Lewis acid, or a combination thereof. Suitable cocatalysts for use include, but are not limited to BHT treated modified methyl aluminoxane (BHT-MMAO)bis(hydrogenated tallow alkyl)methyl, tetrakis(pentafluorophenyl)borate(1-) amine, and any combinations thereof.

The ratio of total number of moles of one or more metal-ligand complexes of Formula (II) to total number of moles of one or more of the activating co-catalysts is from 1:10,000 to 100:1. In some embodiments, the ratio is at least 1:1, in some other embodiments, at least 1:10; and 10:1 or less, and in some other embodiments, 1:1 or less. When a treated alumoxane alone is used as the activating co-catalyst, preferably the number of moles of the treated alumoxane that are employed is at least 10 times the number of moles of the metal-ligand complex of Formula (II). When tris(pentafluorophenyl)borane alone is used as the activating co-catalyst, in some other embodiments, the number of moles of the tris(pentafluorophenyl)borane that are employed to the total number of moles of one or more metal-ligand complexes of Formula (II) is from 0.5:1 to 10:1, in some other embodiments, from 1:1 to 6:1, in some other embodiments, from 1:1 to 5:1.

Polyolefin Compositions

The polyolefin composition according to the present invention comprises the reaction product of one or more olefinic monomers with a biphenylphenolic polymerization catalyst under polymerization conditions and in the presence of one or more treated aluminum-based scavengers, wherein the polyolefin composition comprises less than 50% of the oligomer level of a polyolefin composition produced in an olefin polymerization process in the presence of an untreated aluminum-based scavengers. All individual values and subranges from less than 50% are included herein and disclosed herein; for example, the oligomer content can be from a lower limit of 1, 3, 5, 10, 15, 20, 25, 30, 35 or 40% to an upper limit of 20, 25, 30, 35, 40 or 45%.

The polyolefin composition according to the present invention can, for example, be an ethylene based polymer, for example homopolymers and/or interpolymers (including copolymers) of ethylene and optionally one or more comonomers such as α-olefins. Such ethylene based polymers can have a density in the range of 0.860 to 0.973 g/cm$^3$. All individual values and subranges from 0.860 to 0.973 g/cm$^3$ are included herein and disclosed herein; for example, the density can be from a lower limit of 0.860, 0.880, 0.885, 0.900, 0.905, 0.910, 0.915, or 0.920 g/cm$^3$ to an upper limit of 0.973, 0.963, 0.960, 0.955, 0.950, 0.925, 0.920, 0.915, 0.910, or 0.905 g/cm$^3$.

In one embodiment, such ethylene based polymers can have a long chain branching frequency in the range of from 0.0 to 3 long chain branches (LCB) per 1000 C. In one embodiment, such ethylene based polymers can have a molecular weight distribution ($M_w/M_n$) (measured according to the conventional GPC method) in the range of from greater than or equal to 2.0. All individual values and subranges from greater than or equal to 2 are included herein and disclosed herein; for example, the ethylene/α-olefin interpolymer may have a molecular weight distribution ($M_w/M_n$) in the range of from 2 to 10; or in the alternative, the ethylene/α-olefin interpolymer may have a molecular weight distribution ($M_w/M_n$) in the range of from 2 to 5.

In one embodiment, such ethylene based polymers can have a molecular weight ($M_w$) in the range of from equal to or greater than 20,000 g/mole, for example, in the range of from 20,000 to 350,000 g/moles.

In one embodiment, such ethylene based polymers can have a melt index ($I_2$) in the range of 0.1 to 200 g/10 minutes. All individual values and subranges from 0.1 to 200 g/10 minutes are included herein and disclosed herein; for example, the melt index ($I_2$) can be from a lower limit of 0.1, 0.2, 0.5, 0.6, 0.8, 1, 1.5, 2.0, 2.5, 3.0, 3.5, 4.0, 4.5, 5.0, 10, 15, 20, 30, 40, 50, 60, 80, 90, 100, or 150 g/10 minutes, to an upper limit of 0.9, 1, 1.5, 2.0, 2.5, 3.0, 3.5, 4.0, 4.5, 5.0, 10, 15, 20, 30, 40, 50, 60, 80, 90, 100, 150, or 200 g/10 minutes.

In one embodiment, such ethylene based polymers can have a melt flow ratio ($I_{10}/I_2$) in the range of from 5 to 30. All individual values and subranges from 5 to 30 are included herein and disclosed herein; for example, the melt flow ratio ($I_{10}/I_2$) can be from a lower limit of 5, 5.5, 6, 6.5, 8, 10, 12, 15, 20, or 25 to an upper limit of 5.5, 6, 6.5, 8, 10, 12, 15, 20, 25, or 30.

In one embodiment, such ethylene based polymers can have a zero shear viscosity ratio (ZSVR) in the range of from equal to or greater than 1.0; for example from 1.0 to 10.0; or in the alternative, from 1.0 to 8.0; or in the alternative, from 1.0 to 7.0; or in the alternative, from 1.0 to 5.0; or in the alternative, from 1.0 to 4.0; or in the alternative, from 1.0 to 3.0; or in the alternative, from 1.0 to 2.0.

In one embodiment, the ethylene based polymers may further comprise at least 0.01 parts by weight of metal residues and/or metal oxide residues remaining from the biphenylphenolic polymerization catalyst per one million parts of the ethylene based polymers. The metal residues and/or metal oxide residues remaining from the biphenylphenolic polymerization catalyst in the ethylene based polymers may be measured by x-ray fluorescence (XRF), which is calibrated to reference standards.

The ethylene based polymers may comprise less than 20 percent by weight of units derived from one or more α-olefin comonomers. All individual values and subranges from less than 18 weight percent are included herein and disclosed herein; for example, the ethylene based polymers may comprise from less than 15 percent by weight of units derived from one or more α-olefin comonomers; or in the alternative, less than 10 percent by weight of units derived from one or more α-olefin comonomers; or in the alternative, from 1 to 20 percent by weight of units derived from one or more α-olefin comonomers; or in the alternative, from 1 to 10 percent by weight of units derived from one or more α-olefin comonomers.

The α-olefin comonomers typically have no more than 20 carbon atoms. For example, the α-olefin comonomers may preferably have 3 to 10 carbon atoms, and more preferably 3 to 8 carbon atoms. Exemplary α-olefin comonomers include, but are not limited to, propylene, 1-butene, 1-pentene, 1-hexene, 1-heptene, 1-octene, 1-nonene, 1-decene, and 4-methyl-1-pentene. The one or more α-olefin comonomers may, for example, be selected from the group consisting of propylene, 1-butene, 1-hexene, and 1-octene; or in the alternative, from the group consisting of 1-hexene and 1-octene.

The ethylene based polymers may comprise at least 80 percent by weight of units derived from ethylene. All individual values and subranges from at least 80 weight percent are included herein and disclosed herein; for example, the ethylene based polymers may comprise at least 82 percent by weight of units derived from ethylene; or in the alternative, at least 85 percent by weight of units derived from ethylene; or in the alternative, at least 90 percent by weight of units derived from ethylene; or in the alternative, from 80 to 100 percent by weight of units derived from ethylene; or in the alternative, from 90 to 100 percent by weight of units derived from ethylene.

Polymerization Process

Any conventional polymerization processes may be employed to produce the polyolefin composition according to the present invention. Such conventional polymerization processes include, but are not limited to, solution polymerization process, particle forming polymerization process (such as gas phase polymerization and slurry polymerization), and combinations thereof using one or more conventional reactors e.g. loop reactors, isothermal reactors, fluidized bed reactors, stirred tank reactors, batch reactors in parallel, series, and/or any combinations thereof.

In one embodiment, the polyolefin composition according to the present invention may, for example, be produced via solution-phase polymerization process using one or more loop reactors, isothermal reactors, and combinations thereof.

In general, the solution phase polymerization process occurs in one or more well-stirred reactors such as one or more loop reactors or one or more spherical isothermal reactors at a temperature in the range of from 120 to 300° C.; for example, from 140 to 190° C., and at pressures in the range of from 300 to 1500 psi; for example, from 400 to 750 psi. The residence time in solution phase polymerization process is typically in the range of from 2 to 30 minutes; for example, from 10 to 20 minutes. Ethylene, one or more solvents, one or more biphenylphenolic polymerization catalysts, one or more treated aluminum-based scavengers, optionally one or more cocatalysts, and optionally one or more comonomers are fed continuously to the one or more reactors. Exemplary solvents include, but are not limited to, isoparaffins. For example, such solvents are commercially available under the name ISOPAR E from ExxonMobil Chemical Co., Houston, Tex. The resultant mixture of the ethylene based polymer and solvent is then removed from the reactor and the ethylene based polymer is isolated. Solvent is typically recovered via a solvent recovery unit, i.e. heat exchangers and vapor liquid separator drum, and is then recycled back into the polymerization system.

In one embodiment, the ethylene based polymer may be produced via solution polymerization in a single reactor system, for example a dual loop reactor system, wherein ethylene and optionally one or more α-olefins are polymerized in the presence of one or more biphenylphenolic polymerization catalysts, optionally one or more other catalysts, one or more treated aluminum-based scavengers as described herein, and optionally one or more cocatalysts. In one embodiment, the ethylene based polymer may be produced via solution polymerization in a dual reactor system, for example a dual loop reactor system, wherein ethylene and optionally one or more α-olefins are polymerized in the presence of one or more biphenylphenolic polymerization catalysts, optionally one or more other catalysts, one or more treated aluminum-based scavengers as described herein, and optionally one or more cocatalysts. The treated aluminum-based scavengers as described herein can be used in the first reactor and/or second reactor. In one embodiment, the ethylene based polymer may be produced via solution polymerization in a dual reactor system, for example a dual loop reactor system, wherein ethylene and optionally one or more α-olefins are polymerized in the presence of the treated aluminum-based scavengers as described herein in both reactors.

The procatalyst comprising the metal-ligand complex of Formula (II) may be activated to form an active catalyst composition by combination with one or more cocatalysts, as described above.

The ethylene based polymers may further comprise one or more additives. Such additives include, but are not limited to, antistatic agents, color enhancers, dyes, lubricants, pigments, primary antioxidants, secondary antioxidants, processing aids, UV stabilizers, and combinations thereof. The inventive ethylene based polymers may contain any amounts of additives. The ethylene based polymers may compromise from about 0 to about 10 percent by the combined weight of such additives, based on the weight of the ethylene based polymers and the one or more additives. The ethylene based polymers may further compromise fillers, which may include, but are not limited to, organic or inorganic fillers. Such fillers, e.g. calcium carbonate, talc, $Mg(OH)_2$, can be present in levels from about 0 to about 20, based on the weight of the inventive ethylene based polymers and the one or more additives and/or fillers. The ethylene based polymers may further be blended with one or more polymers to form a blend.

Examples

The following examples illustrate the present invention but are not intended to limit the scope of the invention. The examples of the instant invention demonstrate that the use of modified treated aluminum-based scavengers as described above, e.g. butylated-hydroxytoluene (BHT) modified Al scavengers, with biphenylphenolic-based olefin catalysts substantially suppress oligomerization.

The following list of metal-ligand catalyst complexes were used for the various polymerization examples.

1

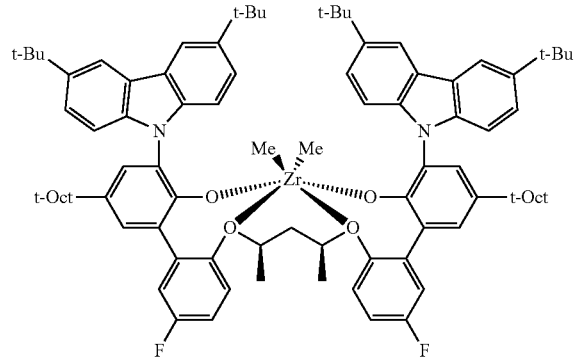

2

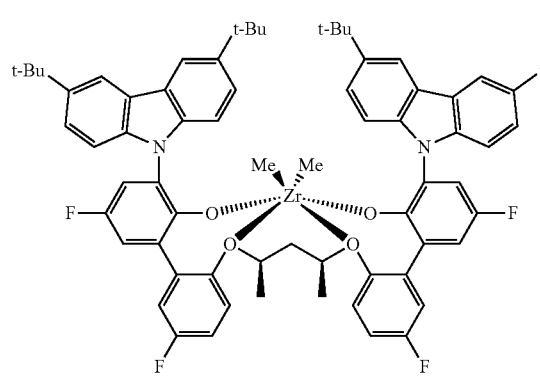

3

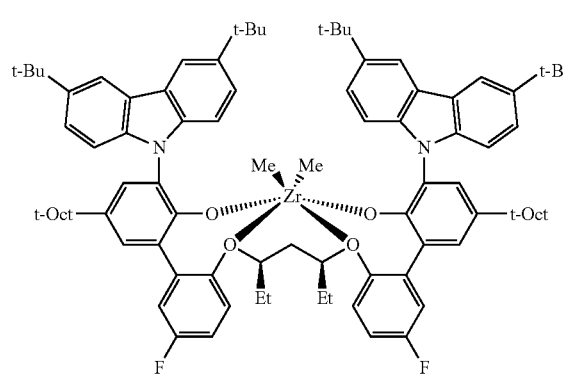

4

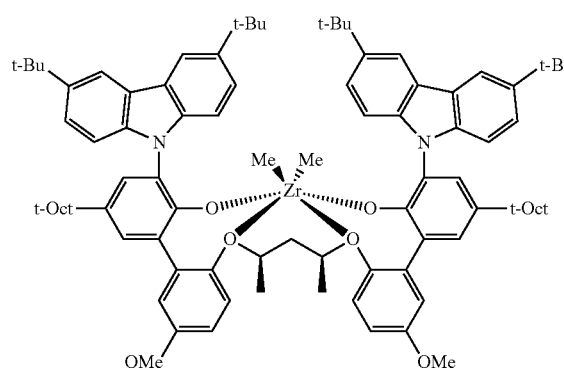

5

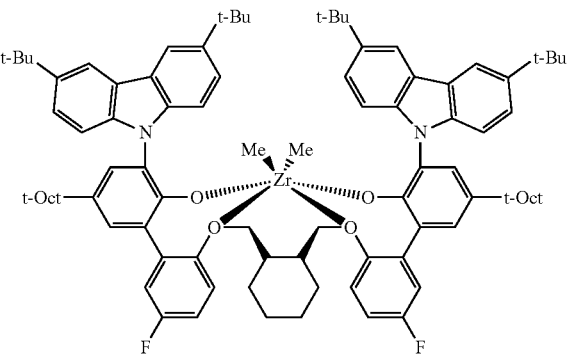

6

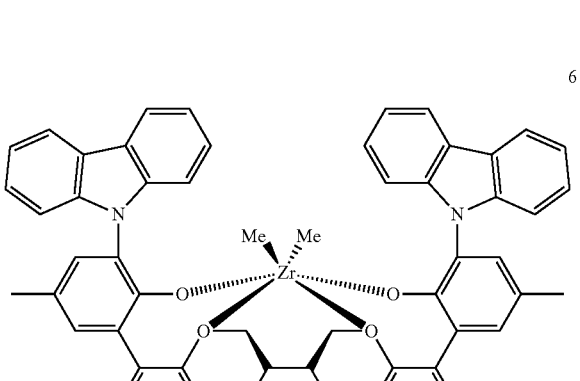

7

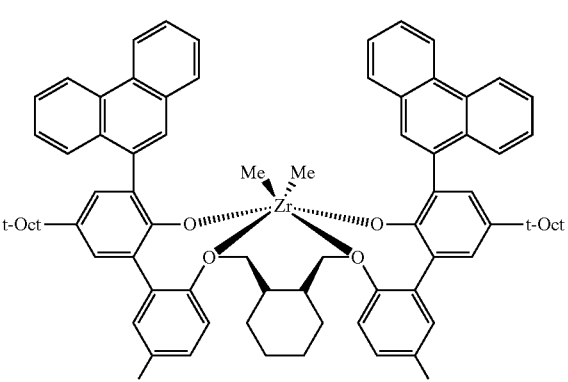

Catalysts

General Preparation of Inventive Scavengers

A suitable alkylaluminum or aluminoxane species is dissolved in a hydrocarbon solvent under an atmosphere of inert gas, and is optionally cooled, heated, or left at ambient temperature. To the resulting stirred solution is added a compound described by Formula I. This mixture is allowed to stir at the desired temperature for 1-24 hours, at which point it is ready for use in the polymerization process.

Preparation of Specific Inventive Embodiments

((BHT)$_2$AlEt)

Triethylaluminum (1.71 mL, 12.5 mmol, 1.0 equiv.) was dissolved in methylcyclohexane (50 mL) under a nitrogen atmosphere and cooled to −30° C. The solution was removed from the freezer and, with vigorous stirring, BHT (5.51 g, 25.0 mmol, 2.0 equiv.) was slowly added. The solution was stirred for 2 hours, during which time the solution gradually warmed to ambient temperature. The resulting solution was used directly in the ethylene polymerization process.

BHT-MMAO

MMAO-3A (4.83 g of a 7 wt % Al solution in heptane) was dissolved in methylcyclohexane to a total volume of 50 mL under a nitrogen atmosphere and cooled to −30° C. The solution was removed from the freezer and, with vigorous stirring, BHT (2.76 g, 12.5 mmol, 1.0 equiv. with respect to Al) was slowly added. The solution was stirred for 2 hours, during which time the solution gradually warmed to ambient temperature. The resulting solution was used directly in the ethylene polymerization process.

IRG-TEA

Triethylaluminum (6.24 mL, 45.7 mmol, 1.0 equiv.) was dissolved in methylcyclohexane (600 mL) under a nitrogen atmosphere. The solution was stirred vigorously, and compound 8 (4,4',4''-((2,4,6-trimethylbenzene-1,3,5-triyl)tris(methylene))tris(2,6-di-tert-butylphenol)) (70.80 g, 91.3 mmol, 2.0 equiv.) was slowly added. The resulting clear yellow solution was used directly in the ethylene polymerization process.

Batch Reactor Ethylene/Octene Copolymerization (Example 1)

A one gallon (3.79 L) stirred autoclave reactor was charged with about 1.325 kg of ISOPAR E mixed alkanes solvent and 1-octene (250 g). The reactor was then heated to 175° C. and charged with an amount of ethylene (about 110 g) to bring the total pressure to about 450 psig (2.95 MPa). The ethylene feed was passed through an additional purification column prior to entering the reactor. The catalyst composition was prepared in a drybox under inert atmosphere by mixing the desired pro-catalyst comprising a metal-ligand complex 1 and a cocatalyst/scavenger mixture (a mixture of 1.2 molar equivalents of [HNMe(C$_{18}$H$_{37}$)$_2$][B(C$_6$F$_5$)$_4$] and 50-500 molar equivalents of the indicated scavengers with additional solvent to give a total volume of about 17 mL. The activated catalyst mixture was then quick-injected into the reactor. The reactor pressure and temperature were kept constant by feeding ethylene during the polymerization and cooling the reactor as needed. After 10 minutes, the ethylene feed was shut off and the solution transferred into a nitrogen-purged resin kettle. The polymer was thoroughly dried in a vacuum oven, and the reactor was thoroughly rinsed with hot ISOPAR E between polymerization runs. Results are reported in Table 1.

TABLE 1

| Example | Polymer yield (g) | Catalyst amt. (μmol) | Efficiency. (g$_{poly}$/g$_{Zr}$) | Scavenger | Al/Zr Ratio | Oligomer Fraction (wt. %) | T$_M$ (° C.) | Density (g/cc) | M$_w$ (g/mol) | MWD |
|---|---|---|---|---|---|---|---|---|---|---|
| Comparative 1 | 24.2 | 0.55 | 482,329 | MMAO | 50 | 38.5 | 83.5 | 0.887 | 665,460 | 1.77 |
| Inventive 1 | 16.6 | 0.80 | 227,462 | (BHT)$_2$AlEt | 50 | <3 | 79.8 | 0.886 | 561,742 | 1.81 |
| Inventive 2 | 15.0 | 0.70 | 234,901 | (BHT)$_2$AlEt | 100 | <3 | 80.8 | 0.887 | 537,482 | 1.75 |
| Inventive 3 | 20.5 | 0.75 | 299,629 | (BHT)$_2$AlEt | 200 | <3 | 80.8 | 0.886 | 611,019 | 1.91 |
| Inventive 4 | 16.8 | 0.75 | 245,549 | (BHT)$_2$AlEt | 500 | <3 | 80.8 | 0.887 | 526,026 | 1.86 |
| Comparative 2 | 18.3 | 0.80 | 250,756 | MMAO | 50 | 12.0 | 79.1 | 0.887 | 568,133 | 1.83 |
| Inventive 5 | 15.8 | 1.00 | 173,200 | BHT-MMAO | 50 | <3 | 77.6 | 0.885 | 623,184 | 1.88 |
| Inventive 6 | 14.8 | 0.90 | 180,264 | BHT-MMAO | 100 | <3 | 77.3 | 0.885 | 577,260 | 1.91 |
| Inventive 7 | 16.1 | 0.90 | 196,098 | BHT-MMAO | 200 | <3 | 78.8 | 0.887 | 614,182 | 1.85 |

Batch Reactor Ethylene/Octene Copolymerization (Example 2)

A one gallon (3.79 L) stirred autoclave reactor was charged with ca 1.325 kg of ISOPAR E mixed alkanes solvent and 1-octene (250 g). The reactor was then heated to 175° C. and charged with hydrogen (if desired) followed by an amount of ethylene (110 g) to bring the total pressure to about 450 psig (2.95 MPa). The ethylene feed was passed through an additional purification column prior to entering the reactor. The catalyst composition was prepared in a drybox under inert atmosphere by mixing the indicated pro-catalyst comprising a metal-ligand complex having one of those structures shown above (as indicated in Table 2) and a cocatalyst/scavenger mixture (a mixture of 1.2 molar equivalents of [HNMe(C$_{18}$H$_{37}$)$_2$][B(C$_6$F$_5$)$_4$] and 50 molar equivalents of the indicated scavengers with additional solvent to give a total volume of about 17 mL. The activated catalyst mixture was then quick-injected into the reactor. The reactor pressure and temperature were kept constant by feeding ethylene during the polymerization and cooling the reactor as needed. After 10 minutes, the ethylene feed was shut off and the solution transferred into a nitrogen-purged resin kettle. The polymer was thoroughly dried in a vacuum oven, and the reactor was thoroughly rinsed with hot ISOPAR E between polymerization runs. Results are reported in Table 2.

TABLE 2

| Example | Catalyst | Polymer yield (g) | Cat. amt. (μmol) | Eff. (g$_{poly}$/g$_{Zr}$) | Scavenger | Al/Zr | Oligomer Fraction (wt. %) | T$_M$ (° C.) | Density (g/cc) | M$_w$ (g/mol) | MWD |
|---|---|---|---|---|---|---|---|---|---|---|---|
| Comparative 3 | 6 | 30.2 | 0.5 | 662,106 | MMAO | 50 | 14.0 | 75.5 | 0.8836 | 116,360 | 1.91 |
| Inventive 8 | 6 | 18 | 0.5 | 394,633 | (BHT)$_2$AlEt | 50 | <3 | 69.7 | 0.8804 | 118,035 | 1.91 |

TABLE 2-continued

| Example | Catalyst | Polymer yield (g) | Cat. amt. (μmol) | Eff. ($g_{poly}/g_{Zr}$) | Scavenger | Al/Zr | Oligomer Fraction (wt. %) | $T_M$ (°C.) | Density (g/cc) | $M_w$ (g/mol) | MWD |
|---|---|---|---|---|---|---|---|---|---|---|---|
| Inventive 9 | 6 | 18.5 | 0.5 | 405,595 | BHT-MMAO | 50 | <3 | 71.1 | 0.8803 | 114,771 | 2.11 |
| Comparative 4 | 4 | 22.3 | 0.65 | 376,082 | MMAO | 50 | 14.0 | 90.0 | 0.8951 | 610,920 | 2.12 |
| Inventive 10 | 4 | 19 | 0.65 | 320,428 | (BHT)$_2$AlEt | 50 | <3 | 88.1 | 0.8915 | 736,857 | 1.95 |
| Inventive 11 | 4 | 19.4 | 0.65 | 327,174 | BHT-MMAO | 50 | <3 | 88.7 | 0.8914 | 718,853 | 1.97 |
| Comparative 5 | 5 | 36.2 | 0.28 | 1,417,234 | MMAO | 50 | 56.0 | 71.6 | 0.8732 | 145,620 | 2.22 |
| Inventive 12 | 5 | 15.7 | 0.28 | 614,657 | (BHT)$_2$AlEt | 50 | <3 | 70.1 | 0.8801 | 131,403 | 2.24 |
| Inventive 13 | 5 | 21.3 | 0.28 | 833,897 | BHT-MMAO | 50 | <3 | 70.7 | 0.8798 | 134,740 | 2.25 |
| Comparative 6 | 7 | 25.5 | 0.75 | 372,709 | MMAO | 50 | 13.0 | 81.0 | 0.8907 | 171,320 | 1.94 |
| Inventive 14 | 7 | 20.7 | 0.75 | 302,552 | (BHT)$_2$AlEt | 50 | <3 | 77.2 | 0.8867 | 169,264 | 1.92 |
| Inventive 15 | 7 | 20.1 | 0.75 | 293,782 | BHT-MMAO | 50 | <3 | 78.7 | 0.8871 | 165,271 | 1.87 |
| Comparative 7 | 2 | 19.8 | 0.75 | 289,398 | MMAO | 50 | 49.0 | 77.9 | 0.8869 | 590,010 | 1.84 |
| Inventive 16 | 2 | 22.4 | 2.25 | 109,133 | (BHT)$_2$AlEt | 50 | <3 | 70.0 | 0.8807 | 498,884 | 1.94 |
| Inventive 17 | 2 | 23.3 | 1.75 | 145,952 | BHT-MMAO | 50 | 8.0 | 71.5 | 0.8805 | 513,850 | 1.89 |
| Comparative 8 | 3 | 38 | 1 | 416,557 | MMAO | 50 | 65.0 | 88.0 | 0.8941 | 1,193,767 | 2.09 |
| Inventive 18 | 3 | 12.3 | 1.25 | 107,866 | BHT-TEA | 50 | <3 | 83.2 | 0.8883 | 783,049 | 2.10 |
| Comparative 9 | 1 | 22.7 | 0.60 | 414,730 | MMAO | 50 | 50.8 | 84.3 | 0.886 | 587,171 | 2.03 |
| Inventive 19 | 1 | 13.9 | 0.75 | 203,163 | BHT-TEA | 50 | <3 | 81.4 | 0.888 | 496,315 | 2.69 |
| Inventive 20 | 1 | 15.8 | 1 | 173,200 | BHT-MMAO | 50 | <3 | 77.6 | 0.8851 | 623,184 | 1.88 |

Batch Reactor Ethylene/Octene Copolymerization (Example 3)

A one gallon (3.79 L) stirred autoclave reactor was charged with about 1.325 kg of ISOPAR E mixed alkanes solvent and 1-octene (250 g). The reactor was then heated to 175° C. and charged with hydrogen (if desired) followed by an amount of ethylene (110 g) to bring the total pressure to about 450 psig (2.95 MPa). The ethylene feed was passed through an additional purification column prior to entering the reactor. The catalyst composition was prepared in a drybox under inert atmosphere by mixing the desired procatalyst comprising a metal-ligand complex 1 and a cocatalyst/scavenger mixture (a mixture of 1.2 molar equivalents of [HNMe(C$_{18}$H$_{37}$)$_2$][B(C$_6$F$_5$)$_4$] and 50 molar equivalents of the indicated scavengers)) with additional solvent to give a total volume of about 17 mL. The inventive scavengers were prepared by mixing additives of Formula I (structures shown below) with the indicated alkylaluminum or aluminoxane species. The activated catalyst mixture was then quick-injected into the reactor. The reactor pressure and temperature were kept constant by feeding ethylene during the polymerization and cooling the reactor as needed. After 10 minutes, the ethylene feed was shut off and the solution transferred into a nitrogen-purged resin kettle. The polymer was thoroughly dried in a vacuum oven, and the reactor was thoroughly rinsed with hot ISOPAR E between polymerization runs. Results are reported in Table 3.

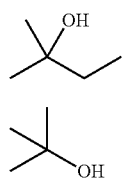

1

2

-continued

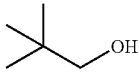

3

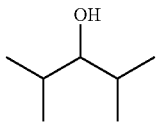

4

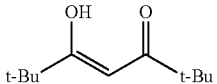

5

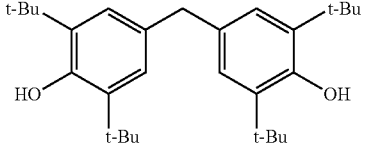

6

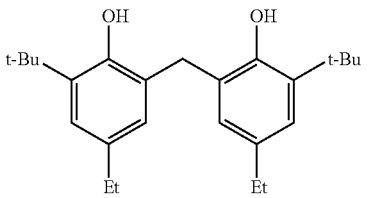

7

-continued

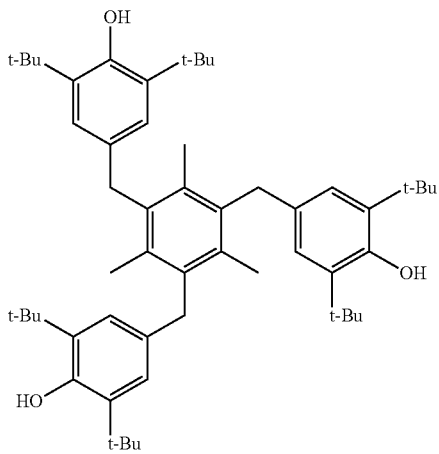

Additives stream is pressurized, via mechanical compressor, to above reaction pressure at 525 psig. The solvent and comonomer (1-octene) feed is pressurized, via mechanical positive displacement pump, to above reaction pressure at 525 psig. The individual catalyst components (procatalyst and co-catalyst) and the scavenger are manually batch diluted to specified component concentrations with purified solvent (ISOPAR E), and pressurized to 525 psig. The co-catalyst is [HNMe($C_{18}H_{37}$)$_2$][B($C_6F_5$)$_4$], commercially available from Boulder Scientific, and is used at a 1.2 molar ratio relative to the procatalyst. All reaction feed flows are measured with mass flow meters, and independently controlled with computer automated valve control systems.

The continuous solution polymerizations are carried out in a 5 L continuously stirred-tank reactor (CSTR). The reactor has independent control of all fresh solvent, monomer, comonomer, hydrogen, and catalyst component feeds. The combined solvent, monomer, comonomer and hydrogen feed to the reactor is temperature controlled to 25° C. The fresh comonomer feed to the polymerization reactor is fed in with the solvent feed. The co-catalyst is fed based on a calculated specified molar ratio (1.2 molar equivalents) to the procatalyst component. Immediately following each

TABLE 3

|  | Poly. Yield (g) | Cat. Amnt. (μmol) | Eff. ($g_{poly}/g_{Zr}$) | Additive | Aluminum | Additive/Al Ratio (mol/mol) | Al/Zr (mol/mol) | Oligo. Fraction (wt %) | $T_M$ (° C.) | $M_w$ (g/mol) | PDI |
|---|---|---|---|---|---|---|---|---|---|---|---|
| Comparative 12 | 21.9 | 0.6 | 0.40 | — | MMAO | — | 50 | 31 |  | 598,760 | 1.84 |
| Inventive 24 | 26.5 | 5 | 0.06 | 1 | AlEt$_3$ | 1 | 50 | <3 |  | 595,751 | 2.00 |
| Inventive 25 | 25.3 | 7.5 | 0.04 | 2 | AlEt$_3$ | 1 | 50 | <3 |  | 593,466 | 1.97 |
| Inventive 26 | 15.1 | 2.5 | 0.07 | 3 | AlEt$_3$ | 1 | 50 | <3 |  | 586,191 | 1.86 |
| Inventive 27 | 16.6 | 2.5 | 0.07 | 4 | AlEt$_3$ | 1 | 50 | <3 |  | 570,679 | 1.92 |
| Inventive 28 | 17.1 | 2.5 | 0.07 | 4 | AlEt$_3$ | 2 | 50 | <3 |  | 621,272 | 1.87 |
| Inventive 29 | 14.0 | 2 | 0.08 | 5 | AlEt$_3$ | 1 | 50 | <3 |  | 552,138 | 1.83 |
| Inventive 30 | 10.8 | 2 | 0.06 | 5 | AlMe$_3$ | 1 | 50 | <3 |  | 537,899 | 1.95 |
| Inventive 31 | 15.2 | 2.5 | 0.07 | 5 | Al$^i$Bu$_3$ | 1 | 50 | <3 |  | 552,715 | 1.95 |
| Comparative 13 | 21.6 | 0.6 | 0.39 | — | MMAO | — | 50 | 29 |  | 577,530 | 1.77 |
| Inventive 32 | 19.1 | 0.9 | 0.23 | 6 | AlEt$_3$ | 0.5 | 50 | 10 |  | 559,373 | 1.85 |
| Inventive 33 | 18.1 | 0.9 | 0.22 | 6 | AlEt$_3$ | 1 | 50 | <3 |  | 553,273 | 1.89 |
| Inventive 34 | 16.0 | 0.9 | 0.19 | 6 | AlEt$_3$ | 2 | 50 | <3 |  | 532,314 | 1.85 |
| Inventive 35 | 12.7 | 0.9 | 0.15 | 7 | AlEt$_3$ | 1 | 50 | <3 |  | 549,630 | 1.88 |
| Inventive 36 | 16.7 | 1 | 0.18 | 7 | AlMe$_3$ | 1 | 50 | <3 |  | 553,138 | 1.92 |
| Comparative 14 | 21.5 | 0.7 | 0.34 | — | MMAO | — | 50 | 42 | 80.9 | 678,227 | 1.79 |
| Inventive 37 | 17.0 | 0.7 | 0.27 | 8 | AlEt$_3$ | 0.33 | 50 | 9 | 77.3 | 581,966 | 1.88 |
| Inventive 38 | 15.4 | 0.85 | 0.20 | 8 | AlEt$_3$ | 0.67 | 50 | <3 | 76.0 | 577,594 | 1.88 |
| Inventive 39 | 15.2 | 0.85 | 0.20 | 8 | AlEt$_3$ | 1 | 50 | <3 | 74.4 | 578,133 | 1.85 |
| Inventive 40 | 15.3 | 0.85 | 0.20 | 8 | AlEt$_3$ | 2 | 50 | <3 | 74.7 | 573,459 | 1.97 |
| Inventive 41 | 16.2 | 0.85 | 0.21 | 8 | MMAO | 0.33 | 50 | 6 | 76.2 | 586,497 | 1.86 |
| Inventive 42 | 18.2 | 0.85 | 0.23 | 8 | MMAO | 1 | 50 | 2 | 74.9 | 578,326 | 1.93 |
| Inventive 43 | 16.8 | 0.85 | 0.22 | 8 | MMAO | 2 | 50 | 3 | 74.7 | 567,895 | 1.87 |
| Comparative 15 | 23.6 | 0.7 | 0.37 | — | MMAO | — | 50 | 24 | 72.2 | 565,080 | 1.88 |
| Inventive 44 | 22.0 | 0.9 | 0.27 | 8 | AlMe$_3$ | 0.33 | 50 | 12 | 65.2 | 578,060 | 1.86 |
| Inventive 45 | 18.3 | 0.9 | 0.22 | 8 | AlMe$_3$ | 0.67 | 50 | <3 |  | 546,510 | 1.91 |
| Inventive 46 | 18.4 | 0.9 | 0.22 | 8 | AlMe$_3$ | 1 | 50 | <3 |  | 576,210 | 1.97 |
| Inventive 47 | 17.7 | 0.9 | 0.22 | 8 | AlMe$_3$ | 2 | 50 | <3 |  | 542,510 | 1.91 |
| Inventive 48 | 21.8 | 0.9 | 0.27 | 8 | Al$^i$Bu$_3$ | 0.33 | 50 | 12 | 72.1 | 561,010 | 1.94 |
| Inventive 49 | 18.4 | 0.9 | 0.22 | 8 | Al$^i$Bu$_3$ | 0.67 | 50 | 11 | 72.8 | 544,530 | 1.98 |
| Inventive 50 | 20.3 | 1 | 0.22 | 8 | Al$^i$Bu$_3$ | 1 | 50 | 6 | 72.6 | 536,280 | 1.89 |
| Inventive 51 | 20.3 | 1 | 0.22 | 8 | Al$^i$Bu$_3$ | 2 | 50 | <3 | 72.0 | 557,390 | 1.96 |

Continuous Reactor Ethylene/Octene Copolymerization (Example 4)

Raw materials (ethylene, 1-octene) and the process solvent (a narrow boiling range high-purity isoparaffinic solvent which is commercially available from SHELL under the name SBP 100/140) are purified with molecular sieves, before introduction into the reaction environment. Hydrogen is supplied at 1160 psig (80 bar) and reduced to about 580 psig (40 bar); and is supplied as a high purity grade, and is not further purified. The reactor monomer feed (ethylene) stream is pressurized, via mechanical compressor, to above reaction pressure at 525 psig. The solvent and comonomer fresh injection location, the feed streams are mixed, with the circulating polymerization reactor contents, with static mixing elements. The effluent from the polymerization reactor (containing solvent, monomer, comonomer, hydrogen, catalyst components, and molten polymer) exits the first reactor loop and passes through a control valve (responsible for maintaining the pressure of the first reactor at a specified target). As the stream exits the reactor, it is contacted with water to stop the reaction. In addition, various additives such as anti-oxidants, can be added at this point. The stream then goes through another set of static mixing elements to evenly disperse the catalyst kill and additives.

Following additive addition, the effluent (containing solvent, monomer, comonomer, hydrogen, catalyst components, and molten polymer) passes through a heat exchanger, to raise the stream temperature, in preparation for separation of the polymer from the other lower boiling reaction components. The stream then enters a two stage separation and devolatization system, where the polymer is removed from the solvent, hydrogen, and unreacted monomer and comonomer. The separated and devolatized polymer melt is pumped through a die specially designed for underwater pelletization, cut into uniform solid pellets, dried, and transferred into a box for storage. Results are reported in Table 4.

TABLE 4

|  | Comparative 10 | Inventive 21 | Inventive 22 |
| --- | --- | --- | --- |
| Metal-ligand Complex | 1 | 1 | 1 |
| Scavenger | MMAO | $(BHT)_2AlEt$ | $(BHT)_2AlEt$ |
| Al/Zr | 25 | 25 | 50 |
| Temp. (° C.) | 175 | 175 | 175 |
| Ethylene Conversion (%) | 88.1 | 88.2 | 88.5 |
| Efficiency ($g_{poly}/g_{Zr}$) | 420,000 | 340,000 | 360,000 |
| C8/Olefin | 26.1 | 25.4 | 25.4 |
| $H_2$ (mol %)* | 0.22 | 0.25 | 0.25 |
| $I_2$ | 0.93 | 1.09 | 0.96 |
| $I_{10}/I_2$ | 6.94 | 6.23 | 6.13 |
| $M_W$ (g/mol) | 108,655 | 102,507 | 106,303 |
| PDI | 1.99 | 2.03 | 2.03 |
| ZSVR | 1.70 | 1.63 | 1.64 |
| Density (g/cc) | 0.913 | 0.914 | 0.913 |
| $T_M$ (° C.) | 105.2 | 110.0 | 109.3 |
| Oligomers (ppm)** | 9944 | 153 | 92 |
| CEF Purge Fraction (%) | 4.9 | 0.4 | 0.3 |

*mol % is molar ratio of hydrogen to ethylene in the feed.
**determined by gas chromatography (GC).

Continuous Reactor Ethylene/Octene Copolymerization (Example 5)

All raw materials (ethylene, 1-octene) and the process solvent (a narrow boiling range high-purity isoparaffinic solvent commercially available under the tradename Isopar E from ExxonMobil Corporation) are purified with molecular sieves before introduction into the reaction environment. Hydrogen is supplied in pressurized cylinders as a high purity grade and is not further purified. The reactor monomer feed (ethylene) stream is pressurized via mechanical compressor to a pressure that is above the reaction pressure, to 750 psig. The solvent and comonomer (1-octene) feed is pressurized via mechanical positive displacement pump to a pressure that is above the reaction pressure, 750 psig. The catalyst components are manually batch diluted to specified component concentrations with purified solvent (ISOPAR E) and pressurized to a pressure that is above the reaction pressure, approximately 750 psig. All reaction feed flows are measured with mass flow meters, independently controlled with computer automated valve control systems.

The continuous solution polymerization reactor system according to the present invention consists of a liquid full, non-adiabatic, isothermal, circulating loop. The combined solvent, monomer, comonomer and hydrogen feed to the reactor is temperature controlled to anywhere between 5° C. to 50° C. and typically 40° C. by passing the feed stream through a heat exchanger. The catalyst components are injected into the polymerization reactor through specially designed injection stingers and are injected into the reactor with no contact time prior to the reactor. The primary catalyst component feed is computer controlled to maintain the reactor monomer concentration at a specified target. The modified aluminum based scavengers, as described herein, and optionally other cocatalyst components are fed based on calculated specified molar ratios to the procatalyst component. Immediately following each fresh injection location (either feed or catalyst), the feed streams are mixed with the circulating polymerization reactor contents with Kenics static mixing elements. The contents of the reactor are continuously circulated through heat exchangers responsible for removing much of the heat of reaction and with the temperature of the coolant side responsible for maintaining isothermal reaction environment at the specified temperature. Circulation around the loop is provided by a screw pump. The effluent from the polymerization reactor (containing solvent, monomer, comonomer, hydrogen, catalyst components, and molten polymer) exits the reactor, and it is contacted with water to stop the reaction. In addition, various additives such as anti-oxidants, can be added at this point. The stream then goes through another set of Kenics static mixing elements to evenly disperse the catalyst kill and additives.

Following additive addition, the effluent (containing solvent, monomer, comonomer, hydrogen, catalyst components, and molten polymer) passes through a heat exchanger to raise the stream temperature in preparation for separation of the polymer from the other lower boiling reaction components. The stream then enters a two stage separation and devolatilization system where the polymer is removed from the solvent, hydrogen, and unreacted monomer and comonomer. The recycled stream is purified before entering the reactor again. The separated and devolatized polymer melt is pumped through a die specially designed for underwater pelletization, cut into uniform solid pellets, dried, and transferred into a hopper. The polymer properties are then validated.

The non-polymer portions removed in the devolatilization step pass through various pieces of equipment, which separate most of the ethylene that is removed from the system to a vent destruction unit (it is, however, recycled in manufacturing units). Most of the solvent is recycled back to the reactor after passing through purification beds. This solvent can still have unreacted co-monomer in it that is fortified with fresh co-monomer prior to re-entry to the reactor. This fortification of the co-monomer is an essential part of the product density control method. This recycle solvent can still have some hydrogen which is then fortified with fresh hydrogen to achieve the polymer molecular weight target. A very small amount of solvent leaves the system as a co-product due to solvent carrier in the catalyst streams and a small amount of solvent that is part of commercial grade co-monomers. Results are reported in Table 5.

TABLE 5

|  | Comparative 11 | Inventive 23 |
| --- | --- | --- |
| Metal-Ligand Complex | 1 | 1 |
| Scavenger | TEA | $(BHT)_2AlEt$ |
| Reactor Temp. (° C.) | 150 | 150 |
| Ethylene Conv. (%) | 79.8 | 78.0 |
| Efficiency (MM g polymer/g Zr) | 12.9 | 4.2 |
| $I_2$ (dg/min) | 0.27 | 0.34 |
| $I_{10}/I_2$ | 6.03 | 5.77 |
| density (g/cc) | 0.911 | 0.912 |
| Al/Zr | 44 | 30 |
| CEF Purge Fraction (wt %) | 5.4 | 0.5 |

Continuous Reactor Ethylene/Octene Copolymerization (Example 6)

Raw materials (ethylene, 1-octene) and the process solvent (a narrow boiling range high-purity isoparaffinic solvent trademarked Isopar E commercially available from ExxonMobil Corporation) are purified with molecular sieves before introduction into the reaction environment. Hydrogen is supplied in pressurized cylinders as a high purity grade and is not further purified. The reactor monomer feed (ethylene) stream is pressurized via mechanical compressor to above reaction pressure at 525 psig. The solvent and comonomer (1-octene) feed is pressurized via mechanical positive displacement pump to above reaction pressure at 525 psig. Modified methylaluminoxane (MMAO), commercially available from AkzoNobel, is used as an impurity scavenger. The individual catalyst components (procatalyst cocatalyst) are manually batch diluted to specified component concentrations with purified solvent (Isopar E) and pressured to above reaction pressure at 525 psig. The cocatalyst is [HNMe($C_{18}H_{37}$)$_2$][B($C_6F_5$)$_4$], commercially available from Boulder Scientific, and is used at a 1.2 molar ratio relative to the procatalyst. All reaction feed flows are measured with mass flow meters and independently controlled with computer automated valve control systems.

The continuous solution polymerizations are carried out in a 1 gal continuously stirred-tank reactor (CSTR). The combined solvent, monomer, comonomer and hydrogen feed to the reactor is temperature controlled between 5° C. and 30° C. and is typically 15° C. All of these materials are fed to the polymerization reactor with the solvent feed. The catalyst is fed to the reactor to reach a specified conversion of ethylene. The cocatalyst is fed separately based on a calculated specified molar ratio (1.2 molar equivalents) to the catalyst component. The MMAO shares the same line as the cocatalyst and flow is based on either an Al concentration in the reactor or a specified molar ratio to the catalyst component. The effluent from the polymerization reactor (containing solvent, monomer, comonomer, hydrogen, catalyst components, and molten polymer) exits the reactor and is contacted with water to terminate polymerization. In addition, various additives such as antioxidants, can be added at this point. The stream then goes through a static mixer to evenly disperse the catalyst kill and additives.

Following additive addition, the effluent (containing solvent, monomer, comonomer, hydrogen, catalyst components, and molten polymer) passes through a heat exchanger to raise the stream temperature in preparation for separation of the polymer from the other lower-boiling reaction components. The stream then passes through the reactor pressure control valve, across which the pressure is greatly reduced. From there, it enters a two stage separation system consisting of a devolatizer and a vacuum extruder, where solvent and unreacted hydrogen, monomer, comonomer, and water are removed from the polymer. At the exit of the extruder, the strand of molten polymer formed goes through a cold-water bath, where it solidifies. The strand is then fed through a strand chopper, where the polymer is cut it into pellets after being air-dried. Results are reported in Table 6.

TABLE 6

|  | Comparative 12 | Inventive 24 |
|---|---|---|
| Metal-Ligand Complex | 1 | 1 |
| Scavenger | MMAO | IRG-TEA |
| Reactor Temp. (° C.) | 165 | 165 |
| Ethylene Conv. (%) | 68.5 | 68.9 |
| Efficiency (MM g polymer/g Zr) | 2.4 | 1.9 |
| $I_2$ (dg/min) | 0.30 | 0.30 |
| $I_{10}/I_2$ | 6.21 | 5.93 |
| density (g/cc) | 0.8957 | 0.8949 |
| Al/Zr | 13 | 10 |
| CEF Purge Fraction (wt %) | 10.0 | 0.9 |
| Oligomers (ppm) | 36,709 | 173 |

* determined by gas chromatography (GC).

Test Methods

Test methods include the following:
Equations 1-20 mentioned in the following test methods are shown below:

$$\% \text{ Crystallinity} = ((H_f)/(292 \text{ J/g})) \times 100 \qquad \text{Equation 1}$$

$$ZSVR = \frac{\eta_{0S}}{\eta_{0L}} \qquad \text{Equation 2}$$

$$\eta_{0L} = 2.29 \times 10^{-15} M_{w-gpc}^{3.65} \qquad \text{Equation 3}$$

$$M_{polyethylene} = A(M_{polystyrene})^B \qquad \text{Equation 4}$$

Test methods include the following:

Density

Samples that are measured for density are prepared according to ASTM D-1928. Measurements are made within one hour of sample pressing using ASTM D-792, Method B.

Melt Index

Melt index ($I_2$) is measured in accordance with ASTM-D 1238, Condition 190° C./2.16 kg, and is reported in grams eluted per 10 minutes. Melt flow rate ($I_{10}$) is measured in accordance with ASTM-D 1238, Condition 190° C./10 kg, and is reported in grams eluted per 10 minutes.

DSC Crystallinity

Differential Scanning calorimetry (DSC) can be used to measure the melting and crystallization behavior of a polymer over a wide range of temperature. For example, the TA Instruments Q1000 DSC, equipped with an RCS (refrigerated cooling system) and an autosampler is used to perform this analysis. During testing, a nitrogen purge gas flow of 50 ml/min is used. Each sample is melt pressed into a thin film at about 175° C.; the melted sample is then air-cooled to room temperature (~25° C.). A 3-10 mg, 6 mm diameter specimen is extracted from the cooled polymer, weighed, placed in a light aluminum pan (ca 50 mg), and crimped shut. Analysis is then performed to determine its thermal properties.

The thermal behavior of the sample is determined by ramping the sample temperature up and down to create a heat flow versus temperature profile. First, the sample is rapidly heated to 180° C. and held isothermal for 3 minutes in order to remove its thermal history. Next, the sample is cooled to −40° C. at a 10° C./minute cooling rate and held isothermal at −40° C. for 3 minutes. The sample is then heated to 150° C. (this is the "second heat" ramp) at a 10° C./minute heating rate. The cooling and second heating curves are recorded. The cool curve is analyzed by setting baseline endpoints from the beginning of crystallization to −20° C. The heat curve is analyzed by setting baseline endpoints from −20° C. to the end of melt. The values determined are peak melting temperature ($T_m$), peak crystallization temperature ($T_c$), heat of fusion ($H_f$) (in Joules per gram), and the calculated % crystallinity for samples using appropriate equation, for example for the ethylene/alpha-olefin interpolymer using Equation 1.

The heat of fusion ($H_f$) and the peak melting temperature are reported from the second heat curve. Peak crystallization temperature is determined from the cooling curve.

Dynamic Mechanical Spectroscopy (DMS) Frequency Sweep

Melt rheology, constant temperature frequency sweeps, were performed using a TA Instruments Advanced Rheometric Expansion System (ARES) rheometer equipped with 25 mm parallel plates under a nitrogen purge. Frequency sweeps were performed at 190° C. for all samples at a gap of 2.0 mm and at a constant strain of 10%. The frequency interval was from 0.1 to 100 radians/second. The stress response was analyzed in terms of amplitude and phase, from which the storage modulus (G'), loss modulus (G"), and dynamic melt viscosity ($\eta^*$) were calculated.

Gel Permeation Chromatography (GPC)

The ethylene/alpha-olefin interpolymers were tested for their properties via GPC, according to the following procedure. The GPC system consists of a Waters (Milford, Mass.) 150° C. high temperature chromatograph (other suitable high temperatures GPC instruments include Polymer Laboratories (Shropshire, UK) Model 210 and Model 220) equipped with an on-board differential refractometer (RI). Additional detectors can include an IR4 infra-red detector from Polymer ChAR (Valencia, Spain), Precision Detectors (Amherst, Mass.) 2-angle laser light scattering detector Model 2040, and a Viscotek (Houston, Tex.) 150R 4-capillary solution viscometer. A GPC with the last two independent detectors and at least one of the first detectors is sometimes referred to as "3D-GPC", while the term "GPC" alone generally refers to conventional GPC. Depending on the sample, either the 15-degree angle or the 90-degree angle of the light scattering detector is used for calculation purposes. Data collection is performed using Viscotek TriSEC software, Version 3, and a 4-channel Viscotek Data Manager DM400. The system is also equipped with an on-line solvent degassing device from Polymer Laboratories (Shropshire, UK). Suitable high temperature GPC columns can be used such as four 30 cm long Shodex HT803 13 micron columns or four 30 cm Polymer Labs columns of 20-micron mixed-pore-size packing (MixA LS, Polymer Labs). The sample carousel compartment is operated at 140° C. and the column compartment is operated at 150° C. The samples are prepared at a concentration of 0.1 grams of polymer in 50 milliliters of solvent. The chromatographic solvent and the sample preparation solvent contain 200 ppm of butylated hydroxytoluene (BHT). Both solvents are sparged with nitrogen. The polyethylene samples are gently stirred at 160° C. for four hours. The injection volume is 200 microliters. The flow rate through the GPC is set at 1 ml/minute.

The GPC column set is calibrated before running the Examples by running twenty-one narrow molecular weight distribution polystyrene standards. The molecular weight (MW) of the standards ranges from 580 to 8,400,000 grams per mole, and the standards are contained in 6 "cocktail" mixtures. Each standard mixture has at least a decade of separation between individual molecular weights. The standard mixtures are purchased from Polymer Laboratories (Shropshire, UK). The polystyrene standards are prepared at 0.025 g in 50 mL of solvent for molecular weights equal to or greater than 1,000,000 grams per mole and 0.05 g in 50 ml of solvent for molecular weights less than 1,000,000 grams per mole. The polystyrene standards were dissolved at 80° C. with gentle agitation for 30 minutes. The narrow standards mixtures are run first and in order of decreasing highest molecular weight component to minimize degradation. The polystyrene standard peak molecular weights are converted to polyethylene $M_w$ using the Mark-Houwink K and a (sometimes referred to as α) values mentioned later for polystyrene and polyethylene. See the Examples section for a demonstration of this procedure.

With 3D-GPC, absolute weight average molecular weight ("$M_{w, Abs}$") and intrinsic viscosity are also obtained independently from suitable narrow polyethylene standards using the same conditions mentioned previously. These narrow linear polyethylene standards may be obtained from Polymer Laboratories (Shropshire, UK; Part No.'s PL2650-0101 and PL2650-0102).

The systematic approach for the determination of multi-detector offsets is performed in a manner consistent with that published by Balke, Mourey, et al. (Mourey and Balke, *Chromatography Polym.*, Chapter 12, (1992)) (Balke, Thitiratsakul, Lew, Cheung, Mourey, *Chromatography Polym.*, Chapter 13, (1992)), optimizing triple detector log ($M_w$ and intrinsic viscosity) results from Dow 1683 broad polystyrene (American Polymer Standards Corp.; Mentor, Ohio) or its equivalent to the narrow standard column calibration results from the narrow polystyrene standards calibration curve. The molecular weight data, accounting for detector volume off-set determination, are obtained in a manner consistent with that published by Zimm (Zimm, B. H., *J. Chem. Phys.*, 16, 1099 (1948)) and Kratochvil (Kratochvil, P., *Classical Light Scattering from Polymer Solutions*, Elsevier, Oxford, N.Y. (1987)). The overall injected concentration used in the determination of the molecular weight is obtained from the mass detector area and the mass detector constant derived from a suitable linear polyethylene homopolymer, or one of the polyethylene standards. The calculated molecular weights are obtained using a light scattering constant derived from one or more of the polyethylene standards mentioned and a refractive index concentration coefficient, dn/dc, of 0.104. Generally, the mass detector response and the light scattering constant should be determined from a linear standard with a molecular weight in excess of about 50,000 daltons. The viscometer calibration can be accomplished using the methods described by the manufacturer or alternatively by using the published values of suitable linear standards such as Standard Reference Materials (SRM) 1475a, 1482a, 1483, or 1484a. The chromatographic concentrations are assumed low enough to eliminate addressing $2^{nd}$ viral coefficient effects (concentration effects on molecular weight).

Quantification of Oligomers by GPC

Integration of the bimodal GPC plots provides quantification of the oligomeric fraction. The polymer fraction is that for which the calculated $M_w$ is greater than 2,000 g/mol, and the oligomer fraction is that for which the calculated $M_w$<2,000 g/mol.

CEF Method

Comonomer distribution analysis is performed with Crystallization Elution Fractionation (CEF) (PolymerChar in Spain) (B Monrabal et al, Macromol. Symp. 257, 71-79 (2007)). Ortho-dichlorobenzene (ODCB) with 600 ppm antioxidant butylated hydroxytoluene (BHT) is used as solvent. Sample preparation is done with autosampler at 160° C. for 2 hours under shaking at 4 mg/ml (unless otherwise specified). The injection volume is 300 μl. The temperature profile of CEF is: crystallization at 3° C./min from 110° C. to 30° C., the thermal equilibrium at 30° C. for 5 minutes, elution at 3° C./min from 30° C. to 140° C. The flow rate during crystallization is at 0.052 ml/min. The flow rate during elution is at 0.50 ml/min. The data is collected at one data point/second.

CEF column is packed by the Dow Chemical Company with glass beads at 125 µm±6% (MO-SCI Specialty Products) with ⅛ inch stainless tubing. Glass beads are acid washed by MO-SCI Specialty with the request from the Dow Chemical Company. Column volume is 2.06 ml. Column temperature calibration is performed by using a mixture of NIST Standard Reference Material Linear polyethylene 1475a (1.0 mg/ml) and Eicosane (2 mg/ml) in ODCB. Temperature is calibrated by adjusting elution heating rate so that NIST linear polyethylene 1475a has a peak temperature at 101.0° C., and Eicosane has a peak temperature of 30.0° C. The CEF column resolution is calculated with a mixture of NIST linear polyethylene 1475a (1.0 mg/ml) and hexacontane (Fluka, purum, ≥97.0%, 1 mg/ml). A baseline separation of hexacontane and NIST polyethylene 1475a is achieved. The area of hexacontane (from 35.0 to 67.0° C.) to the area of NIST 1475a from 67.0 to 110.0° C. is 50 to 50, the amount of soluble fraction below 35.0° C. is <1.8 wt %.

Calculation of Purge Fraction from CEF

In the CEF plots, the purge fraction is the weight fraction of material eluting below 35.0° C.

Creep Zero Shear Viscosity Method

Zero-shear viscosities are obtained via creep tests that are conducted on an AR-G2 stress controlled rheometer (TA Instruments; New Castle, Del.) using 25-mm-diameter parallel plates at 190° C. The rheometer oven is set to test temperature for at least 30 minutes prior to zeroing fixtures. At the testing temperature a compression molded sample disk is inserted between the plates and allowed to come to equilibrium for 5 minutes. The upper plate is then lowered down to 50 µm above the desired testing gap (1.5 mm). Any superfluous material is trimmed off and the upper plate is lowered to the desired gap. Measurements are done under nitrogen purging at a flow rate of 5 L/min. Default creep time is set for 2 hours.

A constant low shear stress of 20 Pa is applied for all of the samples to ensure that the steady state shear rate is low enough to be in the Newtonian region. The resulting steady state shear rates are in the order of $10^{-3}$ $s^{-1}$ for the samples in this study. Steady state is determined by taking a linear regression for all the data in the last 10% time window of the plot of log(J(t)) vs. log(t), where J(t) is creep compliance and t is creep time. If the slope of the linear regression is greater than 0.97, steady state is considered to be reached, then the creep test is stopped. In all cases in this study the slope meets the criterion within 30 minutes. The steady state shear rate is determined from the slope of the linear regression of all of the data points in the last 10% time window of the plot of εvs. t, where ε is strain. The zero-shear viscosity is determined from the ratio of the applied stress to the steady state shear rate.

In order to determine if the sample is degraded during the creep test, a small amplitude oscillatory shear test is conducted before and after the creep test on the same specimen from 0.1 to 100 rad/s. The complex viscosity values of the two tests are compared. If the difference of the viscosity values at 0.1 rad/s is greater than 5%, the sample is considered to have degraded during the creep test, and the result is discarded.

Zero-Shear Viscosity Ratio

Zero-shear viscosity ratio (ZSVR) is defined as the ratio of the zero-shear viscosity (ZSV) of the inventive polymer to the ZSV of a linear polyethylene material at the equivalent weight average molecular weight ($M_{w-gpc}$) as shown in the Equation 2.

The $\eta_{10}$ value (in Pa·s) is obtained from creep test at 190° C. via the method described above. It is known that ZSV of linear polyethylene $\eta_{0L}$ has a power law dependence on its $M_w$ when the $M_w$ is above the critical molecular weight $M_c$. An example of such a relationship is described in Karjala et al. (Annual Technical Conference—Society of Plastics Engineers (2008), 66$^{th}$, 887-891) as shown in the Equation 3 to calculate the ZSVR values. Referring to Equation 4, $M_{w-gpc}$ value (g/mol) is determined by using the GPC method as defined immediately herein below.

$M_{w-gpc}$ Determination

To obtain $M_{w-gpc}$ values, the chromatographic system consist of either a Polymer Laboratories Model PL-210 or a Polymer Laboratories Model PL-220. The column and carousel compartments are operated at 140° C. Three Polymer Laboratories 10-µm Mixed-B columns are used with a solvent of 1,2,4-trichlorobenzene. The samples are prepared at a concentration of 0.1 g of polymer in 50 mL of solvent. The solvent used to prepare the samples contain 200 ppm of the antioxidant butylated hydroxytoluene (BHT). Samples were prepared by agitating lightly for 4 hours at 160° C. The injection volume used is 100 microliters and the flow rate is 1.0 mL/min. Calibration of the GPC column set is performed with twenty one narrow molecular weight distribution polystyrene standards purchased from Polymer Laboratories. The polystyrene standard peak molecular weights are converted to polyethylene molecular weights using Equation 4.

Referring to Equation 4, M is the molecular weight, A has a value of 0.4316 and B is equal to 1.0. A third order polynomial is determined to build the logarithmic molecular weight calibration as a function of elution volume. Polyethylene equivalent molecular weight calculations are performed using Viscotek TriSEC software Version 3.0. The precision of the weight-average molecular weight $\Delta M_w$ is excellent at <2.6%.

Oligomer Analysis by Gas Chromatography

About 5 grams of sample is weighed and transferred to a glass bottle. A pipette is used to deliver 20 mL of methylene chloride to the glass bottle. The bottle is capped with a Teflon lined lid and the contents are shaken for 24 hours at room temperature. After extraction an aliquot of methylene chloride is removed and placed into a GC autosampler vial. The sample extracts are analyzed by GC with a flame ionization detector along with a hydrocarbon standard. Total peak area is determined for peaks between methylene chloride and $C_{44}H_{90}$. The peaks for IRGAFOS 168, oxidized IRGAFOS 168 and IRGANOX 1076 are excluded. The samples don't contain mineral oil based additives. The concentration in parts per million is calculated using an external standard calibration with a $C_{20}H_{42}$ calibration standard. IRGAFOS 168 and IRGANOX 1076 are commercially available from BASF (Ludwigshafen, Germany).

The present invention may be embodied in other forms without departing from the spirit and the essential attributes thereof, and, accordingly, reference should be made to the appended claims, rather than to the foregoing specification, as indicating the scope of the invention.

We claim:

1. An olefin polymerization process comprising:
   contacting one or more olefinic monomers with a biphenylphenolic polymerization catalyst in the presence of one or more treated aluminum-based scavengers under polymerization conditions in a polymerization reactor, wherein said one or more treated aluminum-based scavengers comprise a butylated-hydroxytoluene (BHT) treated aluminum-based scavenger; or the reaction product of an aluminoxane species with a compound of the general Formula I, wherein X is O, R is alkyl, aryl, heteroalkyl, or heteroaryl, and n=1;

 Formula I.

2. The process according to claim 1, wherein the aluminoxane species is methylalumoxane.

3. The process according to claim 1, wherein the butylated-hydroxytoluene (BHT) treated aluminum-based scavenger is

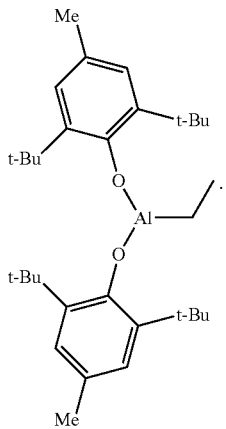

4. A process to mitigate oligomer formation in an olefin polymerization process in a polymerization reactor utilizing a biphenylphenolic polymerization catalyst comprising adding one or more treated aluminum-based scavengers to the polymerization reactor, wherein said one or more treated aluminum-based scavengers comprise a butylated-hydroxytoluene (BHT) treated aluminum-based scavenger; or the reaction product of an aluminoxane species with a compound of the general Formula I, wherein X is O, R is alkyl, aryl, heteroalkyl, or heteroaryl, and n=1;

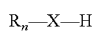 Formula I.

5. The process according to claim 4, wherein the aluminoxane species is methylalumoxane.

6. The process according to claim 4, wherein the butylated-hydroxytoluene (BHT) treated aluminum-based scavenger is

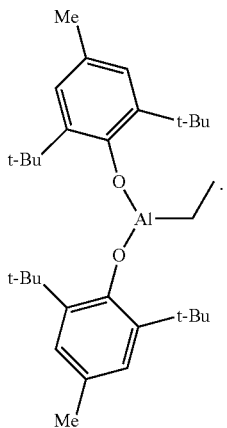

* * * * *